(12) United States Patent
Nishizawa et al.

(10) Patent No.: US 6,747,884 B2
(45) Date of Patent: Jun. 8, 2004

(54) POWER CONVERTER DEVICE

(75) Inventors: Yuji Nishizawa, Tokyo (JP); Akira Hatai, Tokyo (JP); Kei Terada, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/297,837

(22) PCT Filed: Apr. 13, 2001

(86) PCT No.: PCT/JP01/03195
§ 371 (c)(1),
(2), (4) Date: Dec. 11, 2002

(87) PCT Pub. No.: WO02/084855
PCT Pub. Date: Oct. 24, 2002

(65) Prior Publication Data
US 2003/0169611 A1 Sep. 11, 2003

(51) Int. Cl.[7] ........................................... H02M 7/5387
(52) U.S. Cl. ....................................... 363/132; 363/141
(58) Field of Search ................................. 363/132, 131, 363/98, 17, 56.02, 141

(56) References Cited

U.S. PATENT DOCUMENTS 5,500,792 A * 3/1996 Jeon et al. .................... 363/98
5,986,909 A   11/1999 Hammond et al.

FOREIGN PATENT DOCUMENTS

JP    11-299129    10/1999
JP    2000-60140   2/2000

* cited by examiner

*Primary Examiner*—Shawn Riley
(74) *Attorney, Agent, or Firm*—Sughrue Mion, PLLC

(57) ABSTRACT

The present invention provides a variable-speed control system which is capable of estimating saturation voltages of respective switching elements in the inverter operation to execute the saturation voltage compensation and thus getting an inverter output voltage indicated by a command value.

14 Claims, 13 Drawing Sheets

(a)

(b)

POWER CONVERTER DEVICE

TECHNICAL FIELD

The present invention relates to a power converter device such as an inverter device for driving a motor at a variable speed, an uninterruptible power supply unit, or the like.

BACKGROUND ART

FIG. 11 is a view showing a configuration of an inverter device as a power converter device according to the related art.

In FIG. 11, reference numeral 30 is an AC power supply, reference numeral 31 is an inverter device, reference numeral 32 is a converter portion for converting the AC power into the DC power, and reference numeral 33 is a capacitor for smoothing the DC voltage. Also, reference numeral 34 is an inverter portion for inverting the DC power into the AC power that has the variable frequency and the variable voltage, the inverter portion having output power elements, which has self turnoff elements (referred to as "switching elements" hereinafter) Tr1, Tr2, Tr3, Tr4, Tr5, Tr6 and free wheeling diodes D1, D2, D3, D4, D5, D6. Also, Vuo is a potential of a connection point u between the switching elements Tr1 and Tr2, Vv0 is a potential of a connection point v between the switching elements Tr3 and Tr4, and Vw0 is a potential of a connection point w between the switching elements Tr5 and Tr6.

Also, reference numeral 35 is a control portion for ON/OFF-controlling the switching elements of the inverter portion 34, and reference numeral 36 is a motor such as the induction motor that is driven at a variable speed as a load.

Also, reference numeral 40 is a CPU as an arithmetic circuit for receiving various commands such as an operation command, a speed command, etc. and various set values such as an accelerating/decelerating time, a V/f pattern, etc. as input signals, calculating an output frequency and an output voltage, and outputting switching signals Su1, Su2, Sv1, Sv2, Sw1, Sw2 to turn the switching elements ON/OFF. Also, reference numeral 41 is a memory as a storing means for storing various data such as the accelerating/decelerating times, a relational expression between the output frequency/output voltage, etc.

Also, reference numeral 42a to 42f are driving portions for amplifying the switching signals Su1, Su2, Sv1, Sv2, Sw1, Sw2, which are output from the control portion 35, up to base signals having amplitudes that can drive the switching elements Tr1, Tr2, Tr3, Tr4, Tr5, Tr6.

As this output voltage controlling system, there are the pulse width modulation (abbreviated to "PWM" hereinafter) and the pulse amplitude modulation (abbreviate to "PAM" hereinafter). With reference to the example of the PWM system that the output voltage is controlled by changing time periods during which the switching elements Tr1, Tr2, Tr3, Tr4, Tr5, Tr6 of the inverter portion 34 are turned ON, explanation will be described hereinafter.

The CPU 40 receives various commands (not shown) such as the operation command, the speed command, etc. and various set values such as the accelerating/decelerating time, the V/f pattern, etc. stored in the memory 41 as the input signals, calculates the output frequency and the output voltage, and outputs the switching signals Su1, Su2, Sv1, Sv2, Sw1, Sw2 to turn the switching elements ON/OFF.

FIG. 12 is a view showing various waveforms of the inverter device in the PWM system according to the related art, wherein (a) is a view showing relationships between command voltage waveforms Vur, Vvr, Vwr in a U phase, a V phase, a W phase and a carrier wave Vtri, (b) is a view showing a command voltage waveform Vu at a connection point u between the switching elements Tr1 Tr2, (c) is a view showing a command voltage waveform Vv at a connection point v between the switching elements Tr3 and Tr4, (d) is a view showing a command voltage waveform Vw at a connection point w between the switching elements Tr5 and Tr6, and (e) is a view showing an inverter output voltage waveform Vuv=Vu−Vv.

The CPU 40 compares the command voltage waveforms Vur, Vvr, Vwr shown in (a) with the carrier wave Vtri, and then brings the switching elements into their ON state if the command voltage waveforms are larger than the carrier wave, and brings the switching elements into their OFF state if the command voltage waveforms are smaller than the carrier wave, as shown in (b), (c), (d).

Next, an operation of the inverter device according to the related art will be explained hereunder.

When the power supply is turned ON, the converter portion 32 converts the AC power of the AC power supply 30 into the DC power and smoothes this DC power by the capacitor 33.

Also, the control portion 35 receives various commands such as the operation command, the speed command, etc. and various set values such as the accelerating/decelerating time, the V/f pattern, etc. as the input signals, calculates the output frequency and the output voltage, and outputs the switching signals Su1, Su2, Sv1, Sv2, Sw1, Sw2 to turn the switching elements ON/OFF.

Also, the inverter portion 34 converts the DC power into the AC power having the variable frequency and the variable voltage by ON/OFF-controlling the switching elements Tr1, Tr2, Tr3, Tr4, Tr5, Tr6 based on the switching signals Su1, Su2, Sv1, Sv2, Sw1, Sw2 output from the control portion 35.

The AC power having the variable frequency and the variable voltage is supplied to the motor 36, whereby this motor 36 can be driven at a variable speed.

FIG. 13 is a view showing output voltages of the inverter device according to the related art, wherein (a) is a view showing the voltage waveform Vu0 at the connection point u, (b) is a view showing the voltage waveform Vv0 at the connection point v, (c) is a view showing the voltage waveform Vw0 at the connection point w, and (d) is a view showing the voltage waveform of the output voltage Vuv0 (=Vu0−Vv0).

In FIG. 13, E is a command voltage, Vuo is a potential waveform of the connection point u between the switching elements Tr1 and Tr2, Vv0 is a potential waveform of the connection point v between the switching elements Tr3 and Tr4, Vw0 is a potential waveform of the connection point w between the switching elements Tr5 and Tr6, and VTr1_ON, VTr2_ON, VTr3_ON, VTr4_ON, VTr5_ON, VTr6_ON are saturation voltages, respectively when the switching elements (Tr1, Tr2, Tr3, Tr4, Tr5, Tr6) are turned ON.

As shown in FIG. 13, in the ON/OFF control of the switching elements (Tr1, Tr2, Tr3, Tr4, Tr5, Tr6), the saturation voltages (VTr1_ON, VTr2_ON, VTr3_ON, VTr4_ON, VTr5_ON, VTr6_ON) are present when the switching elements (Tr1, Tr2, Tr3, Tr4, Tr5, Tr6) are turned ON. Therefore, the potential Vu0 at the connection point u has an amplitude of E-VTr1_ON~VTr2_ON as shown in (a), the potential Vv0 at the connection point v has an amplitude of E-VTr3_ON VTr4_ON as shown in (b), and the potential Vw0 at the connection point w has an amplitude of E-VTr5_ON~VTr6_ON as shown in (c).

For this reason, the output voltage Vuv0 when the switching elements Tr1, Tr4 are turned ON is given as not Vuv0=E−0=E, but $$Vuv0 = (Vu0 - Vv0)$$
$$= (E - VTr1\_ON) - VTr4\_ON$$
$$= E - (VTr1\_ON + VTr4\_ON).$$

In contrast, the output voltage Vuv0 (=Vu0−Vv0) when the switching elements Tr2, Tr3 are turned ON is given as not Vuv0=0−E=−E, but $$Vuv0 = (Vu0 - Vv0)$$
$$= VTr2\_ON - (E - VTr3\_ON)$$
$$= (VTr2\_ON + VTr3\_ON) - E.$$

In the inverter device according to the related art, the command voltage is supplied to the inverter as the input voltage as it is. Therefore, the amplitude of the output voltage does not have the amplitude of the command voltage E~−E, but the amplitude of the actual output voltage is in the range of $$E-(VTr1\_ON+VTr4\_ON) \sim E+(VTr2\_ON+VTr3\_ON),$$

whereby the part of the saturation voltages becomes the error.

It is possible to get the smooth output, in which the low order harmonics contained in the output voltage of the inverter is reduced by the PWM system. However, the command voltage is supplied to the inverter as the input voltage as it is, and thus the saturation voltages of the switching elements in the inverter operation are not taken into consideration. Therefore, in the inverter operation, the inverter output voltage for generating the saturation voltage of the switching elements does not coincide with the voltage indicated by the command value, and thus there is the problem that the precise voltage cannot be output.

Also, there is the system that the actual output voltage is measured such that the inverter output voltage coincides with the value indicated by the command, and then the voltage that is subjected to the saturation voltage compensation is input into the inverter. But this system needs to add the circuit separately, and thus there are the problems that a cost is increased and a size of the circuit is increased.

In addition, the input voltage of the motor is low in the low-speed operation range, and the influence of the saturation voltage of the switching elements is enhanced relatively. Thus, there is the problem that the speed ripple in the low-speed operation range is increased.

The present invention has been made to overcome above such subjects, and it is a first object of the present invention to provide a variable-speed control apparatus that is capable of estimating saturation voltages of switching elements in the inverter operation to execute a saturation voltage compensation and thus getting an inverter output voltage indicated by a command value.

Also, it is a second object of the present invention to provide a variable-speed control apparatus that is capable of estimating easily the saturation voltages of switching elements in the inverter operation.

DISCLOSURE OF THE INVENTION

A power converter device of the present invention has an inverter portion having a switching element and a free wheeling diode element, the inverter portion for converting a DC power into an AC power, a control portion for ON/OFF-controlling the switching elements of the inverter portion, and a current sensor for sensing current flowing through one of the switching element and the free wheeling diode element, in which the control portion has a current discriminating circuit for discriminating that sensed currents sensed by the current sensors are either current flowing through the switching elements or current flowing through the free wheeling diode elements, a saturation voltage estimation table for showing relationships between temperature of the switching element, current value of the switching element, temperature of the free wheeling element, and current value of the free wheeling element and saturation voltages of the switching elements; and a saturation voltage compensating unit for receiving the temperature of the switching element and the current discriminated by the current discriminating circuit, estimating a saturation voltage of the switching element by using the saturation voltage estimation table, and forming saturation voltage compensated voltage in which a command voltage to an inverter is compensated with the estimated saturation voltage, and in which the switching elements of the inverter portion are ON/OFF-controlled based on the saturation voltage compensated voltage. Therefore, the reduction in the inverter output voltage due to the saturation voltage of the switching element can be prevented and thus the more precise voltage control can be achieved.

A power converter device of the invention has an inverter portion having a switching element and a free wheeling diode element, the inverter portion for converting a DC power into an AC power, a control portion for ON/OFF-controlling the switching elements of the inverter portion, and a gate voltage detecting circuit insulating circuit for detecting gate voltage of the switching element, in which the control portion has a current discriminating circuit for discriminating that sensed currents sensed by the current sensors are either current flowing through the switching elements or current flowing through the free wheeling diode elements, a saturation voltage estimation table for showing relationships between temperature of the switching element, current value of the switching element, temperature of the free wheeling element, and current value of the free wheeling element and saturation voltages of the switching elements, and a saturation voltage compensating unit for receiving the gate voltage of the switching element and the current discriminated by the current discriminating circuit, estimating a saturation voltage of the switching element by using the saturation voltage estimation table, and forming saturation voltage compensated voltage in which a command voltage to an inverter is compensated with the estimated saturation voltage, and in which the switching elements of the inverter portion are ON/OFF-controlled based on the saturation voltage compensated voltage. Therefore, even if the load is heavy and the saturation voltage is changed depending on the magnitude of the gate-emitter voltage in the ON-state of the switching elements, the saturation voltage can be compensated with good precision and thus the more precise voltage control can be achieved.

In addition, temperature sensors are fitted to the switching element and the free wheeling diode element to sense temperature of the switching element and temperature of the free wheeling diode element. Therefore, the temperatures of the switching elements and the free wheeling diode elements can be sensed precisely.

Also, temperature sensor is fitted in the vicinity of the switching element and the free wheeling diode element, which constitute a pair, on a substrate on which the switching element and the free wheeling diode element are mounted. The control portion estimates temperature of the switching element and temperature of the free wheeling diode element based on substrate temperature sensed by the temperature sensor, stationary thermal resistance between the switching element and the substrate, stationary thermal resistances between the free wheeling diode element and the substrate, heating value of the switching element calculated based on the sensed current, and heating value of the free wheeling diode element calculated based on the sensed current. Therefore, the fitting of the temperature sensors can be facilitated.

In addition, a temperature sensor is fitted to one location on a substrate on which the switching element and the free wheeling diode element are mounted. The control portion estimates temperature of the switching element and temperature of the free wheeling diode element based on substrate temperature sensed by the temperature sensor, stationary thermal resistance between the switching element and the substrate, stationary thermal resistances between the free wheeling diode element and the substrate, heating value of the switching element calculated based on the sensed current, and heating value of the free wheeling diode element calculated based on the sensed current. Therefore, the fitting of the temperature sensors can be made much more easy.

Further, temperature sensors are fitted to a location on a fin fitted to a substrate on which the switching element and the free wheeling diode element are mounted, the location corresponding to the switching element and the free wheeling diode element. The control portion estimates temperature of the switching element and the free wheeling diode element based on substrate temperature sensed by the temperature sensors, stationary thermal resistance between the switching element and the substrate, stationary thermal resistance between the fin and the substrate, stationary thermal resistance between the free wheeling diode element and the substrate, the stationary thermal resistance between the fin-the substrate and heating values of the switching element calculated based on the sensed currents, and heating values of the free wheeling diode element. Therefore, the fitting of the temperature sensors can be further facilitated.

Furthermore, temperature sensor are fitted to a location on a fin fitted to a substrate on which the switching element and the free wheeling diode element are mounted, the location corresponding to a pair of the switching element and the free wheeling diode element. The control portion estimates temperature of the switching element and temperature of the free wheeling diode element based on substrate temperature sensed by the temperature sensor, stationary thermal resistances between the switching element and the substrate, a stationary thermal resistance between the fin and the substrate, stationary thermal resistances between the free wheeling diode element and the substrate, the stationary thermal resistance between the fin and the substrate, heating value of the switching element calculated based on the sensed current, and heating value of the free wheeling diode element calculated based on the sensed current. Therefore, the fitting of the temperature sensors can be made easy further more.

Besides, temperature sensor is fitted to one location on a fin that is fitted to a substrate on which the switching element and the free wheeling diode element are mounted. The control portion estimates temperature of the switching element and temperature of the free wheeling diode element based on substrate temperature sensed by the temperature, stationary thermal resistances between the switching element and the substrate, stationary thermal resistance between the fin and the substrate, stationary thermal resistances between the free wheeling diode element and the substrate, stationary thermal resistance between the fin and the substrate, heating value of the switching element calculated based on the sensed current, and heating value of the free wheeling diode element based on the sensed current.

BEST MODE FOR CARRYING OUT THE INVENTION

Embodiment 1

Figure 1:
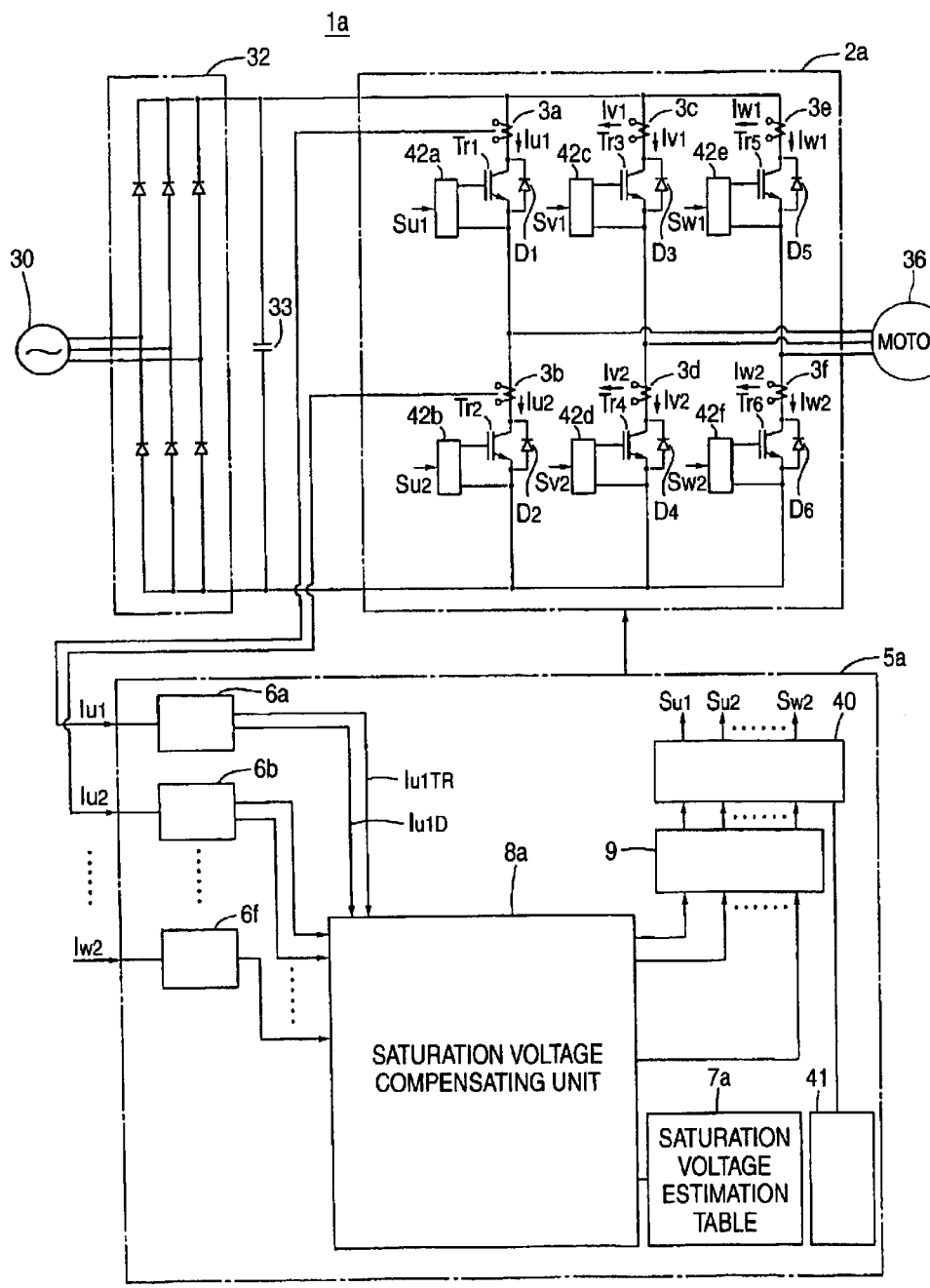
FIG. 1 is a view showing a configuration of an inverter device as a power converter device according to an embodiment 1 of the present invention.
Figure 11:
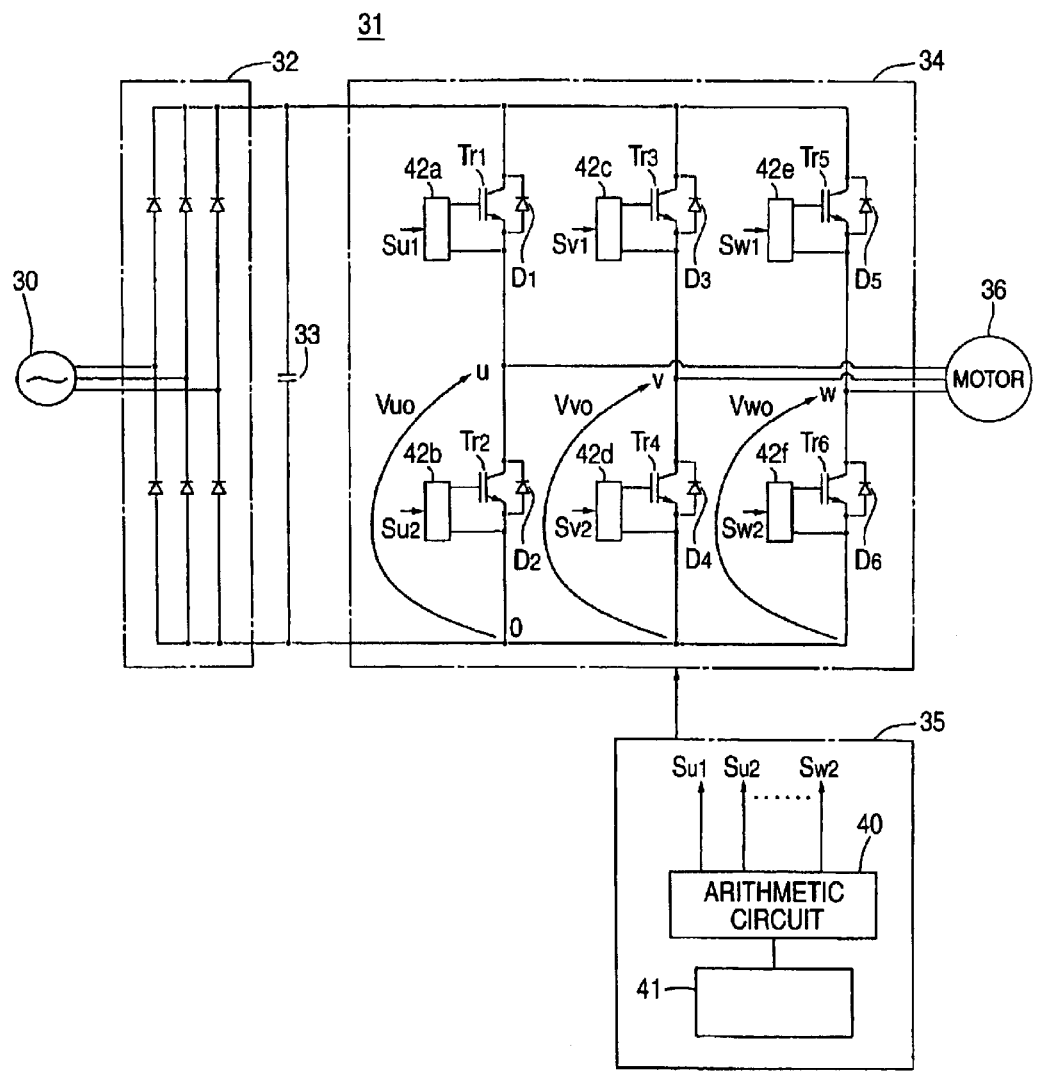
FIG. 11 is a view showing a configuration of an inverter device as a power converter device according to the related art.
Figure 12:
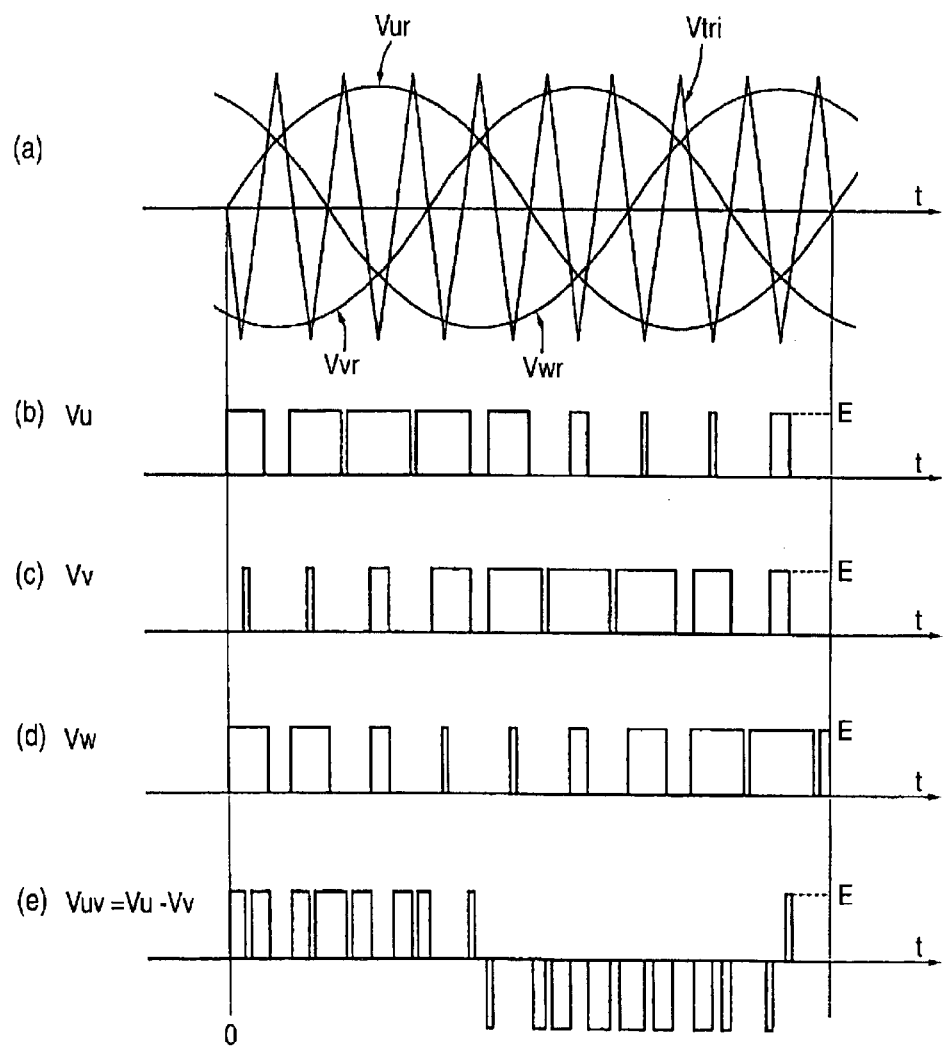
FIGS. 12(a) through (e) are views showing various waveforms of the inverter device in the PWM system according to the related art.

FIG. 1 is a view showing a configuration of an inverter device as a power converter device according to an embodiment 1 of the present invention. In FIG. 1, reference numerals 30, 32, 33, 36, 40, 41, 42a to 42f, Tr1 to Tr6, D1 to D6 are similar to those in FIG. 11, and thus their explanation will be omitted. Also, reference numeral 1a is an inverter device, reference numeral 2a is an inverter portion, reference numerals 3a to 3f are current sensors, and reference numerals Iu1, Iu2, Iv1, Iv2, Iw1, Iw2 are sensed currents.

Also, the reference numeral Iu1, Iu2, Iv1, Iv2, Iw1, Iw2 are currents that flow through the switching elements Tr1 to Tr6 or the free wheeling diode elements D1 to D6, and directions indicated by arrows shown in FIG. 1 are assumed as the positive directions.

Also, reference numeral 5a is a control portion for ON/OFF-controlling the switching elements of the inverter portion 2a. Also, reference numerals 6a to 6f are current discriminating circuits for discriminating that the sensed currents Iu1, Iu2, Iv1, Iv2, Iw1, Iw2 sensed by the current sensors 3a to 3f are either currents flowing through the switching elements Tr1 to Tr6 or currents flowing through the free wheeling diodes D1 to D6.

The current discriminating circuits 6a to 6f discriminate that the sensed currents Iu1, Iu2, Iv1, Iv2, Iw1, Iw2 sensed by the current sensors 3a to 3f are either the currents that are flowing through the switching elements Tr1 to Tr6 or the currents that are flowing through the free wheeling diodes D1 to D6. For example, the current discriminating circuit 6a discriminates the sensed current Iu1 sensed by the current sensor 3a as $I_{u1TR}=Iu1$, $I_{u1D}=0$ in the case of Iu1≧0, and $I_{u1TR}=0$, $I_{u1D}=Iu1$ in the case of Iu1<0.

Also, reference numeral 7a is a saturation voltage estimation table indicating relationships among the temperatures of the switching elements, the current values of the switching elements, the temperatures of the free wheeling diodes, the current-values of the free wheeling diodes, and the saturation voltages of the switching elements in the inverter operation, and reference numeral 8a is a saturation voltage compensating unit. Also, reference numeral 9 is a command voltage correcting portion.

Figure 2:
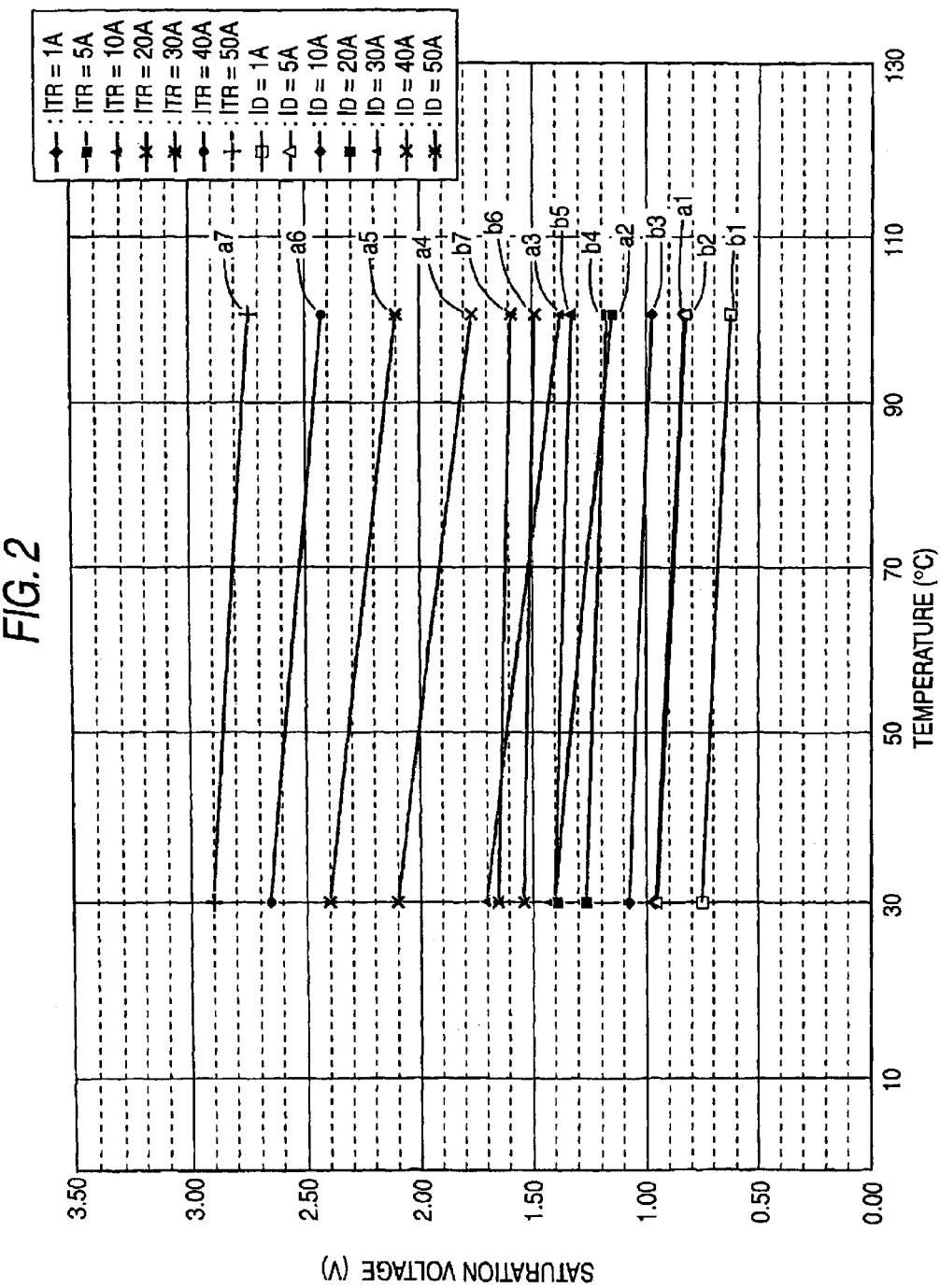
FIG. 2 is a view showing a saturation voltage estimation table in the inverter device according to the embodiment 1 of the present invention.

FIG. 2 is a view showing the saturation voltage estimation table in the inverter device according to the embodiment 1 of the present invention, wherein the gate voltage (the gate-emitter voltage VGE) is 15V. In FIG. 2, a1 to a7 denote temperature/saturation voltage characteristics of the switching elements every current when the currents are flown through the switching elements, and b1 to b7 denote temperature/saturation voltage characteristics of the free wheeling diode elements every current when the currents are flown through the free wheeling diode elements.

Now, a1 is the temperature/saturation voltage characteristic in the case that the current flowing through the switching elements Tr1 to Tr6 (referred to as an "$I_{TR}$" hereinafter) is 1 A, a2 is the temperature/saturation voltage characteristic in the case that $I_{TR}$=5 A, a3 is the temperature/saturation voltage characteristic in the case that $I_{TR}$=10 A, a4 is the temperature/saturation voltage characteristic in the case that $I_{TR}$=20 A, a5 is the temperature/saturation voltage characteristic in the case that $I_{TR}$=30 A, a6 is the temperature/saturation voltage characteristic in the case that $I_{TR}$=40 A, and a7 is the temperature/saturation voltage characteristic in the case that $I_{TR}$=50 A.

Also, b1 is the temperature/saturation voltage characteristic in the case that the current flowing through the free wheeling diode elements D1 to D6 (referred to as an "$I_D$" hereinafter) is 1 A, b2 is the temperature/saturation voltage characteristic in the case that $I_D$=5A, b3 is the temperature/saturation voltage characteristic in the case that $I_D$=10 A, b4 is the temperature/saturation voltage characteristic in the case that $I_D$=20 A, b5 is the temperature/saturation voltage characteristic in the case that $I_D$=30 A, b6 is the temperature/saturation voltage characteristic in the case that $I_D$=40 A, and b7 is the temperature/saturation voltage characteristic in the case that $I_D$=50 A.

If the sensed currents Iu1, Iu2, Iv1, Iv2, Iw1, Iw2 sensed by the current sensors 3a to 3f are different from the current values $I_{TR}$ or $I_D$ set forth in the saturation voltage estimation table, the temperature/saturation voltage characteristic is estimated based on the temperature/saturation voltage characteristic of the current value $I_{TR}$ or the temperature/saturation voltage characteristic of the current value $I_D$, that is close to the value in the table.

Figure 3:
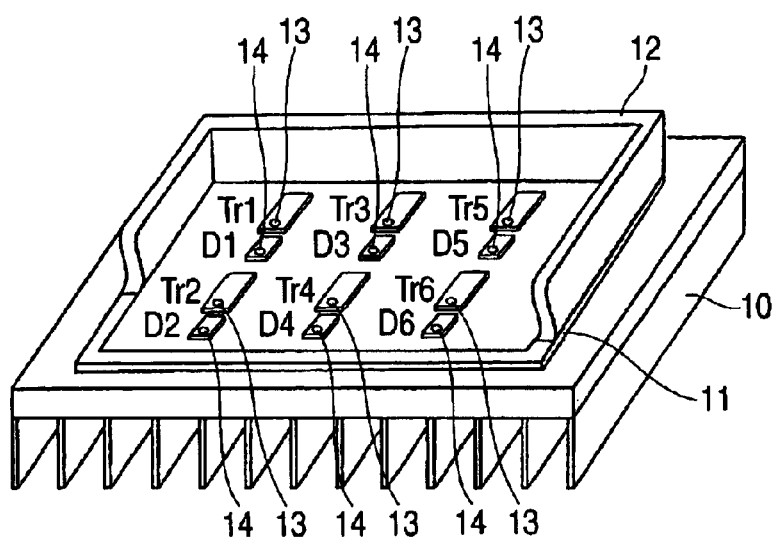
FIG. 3 is a view showing an outer appearance of an inverter main circuit of the inverter device according to the embodiment 1 of the present invention.

FIG. 3 is a view showing an outer appearance of an inverter main circuit of the inverter device according to the embodiment 1 of the present invention. In FIG. 3, reference numeral 10 is a cooling fin, reference numeral 11 is a main circuit substrate, reference numeral 12 is a case, reference numeral 13 is a switching element to which a sensor (temperature sensor) is fitted, reference numeral 14 is a free wheeling diode element to which the sensor (temperature sensor) is fitted, Tr1 to Tr6 are the switching elements, and D1 to D6 are the free wheeling diode elements. In FIG. 3, there is shown an example in which the sensor (temperature sensor) is fitted to the switching elements Tr1 to Tr6 and the free wheeling diode elements D1 to D6.

A voltage control in the inverter device according to the embodiment 1 will be explained with reference to FIG. 1 to FIG. 3 hereunder.

In the control portion 5a of the inverter device according to the embodiment 1, the current discriminating circuits 6a to 6f discriminate in the inverter operation that the sensed currents Iu1, Iu2, Iv1, Iv2, Iw1, Iw2 sensed by the current sensors 3a to 3f are either the currents flowing through the switching elements Tr1 to Tr6 or the currents flowing through the free wheeling diodes D1 to D6, and then output the current values $I_{TR}$ or $I_D$ ($I_{u1TR}$, $I_{u1D}$, $I_{u2TR}$, $I_{u2D}$, $I_{v1TR}$, $I_{v1D}$, $I_{v2TR}$, $I_{v2D}$, $I_{w1TR}$, $I_{w1D}$, $I_{w2TR}$, $I_{w2D}$) to the saturation voltage compensating unit 8a.

The saturation voltage compensating unit 8a receives the temperature Tj of the switching elements or that of the free wheeling diodes sensed by the temperature sensors fitted to the switching elements 13 in the inverter operation and the current values ($I_{TR}$ or $I_D$) output from the current discriminating circuits 6a to 6f, then estimates the saturation voltages of the switching elements by using the saturation voltage estimation table 7a, and then outputs the saturation voltage compensated voltage in which the command voltage to the inverter is compensated with the estimated saturation voltage.

Assuming that the temperatures of the switching elements Tr1, Tr4 in the inverter operation are Tj_Tr1, Tj_Tr4, the current values of the switching elements Tr1, Tr4 are Iu1, Iu2, and the estimated saturation voltages of the switching elements Tr1, Tr4 are Von(Tj_Tr1, Iu1), Von(Tj_Tr4, Iu2) when the switching elements Tr1, Tr4 are turned ON, after performing the voltage compensation by adding these saturation voltages to the command voltage to the inverter, the input voltage E' to the inverter can be expressed by Eq.(1).

$$E'=E+Von(Tj\_Tr1, Iu1)+Von(Tj\_Tr4, Iu2) \quad (1)$$

Figure 13:
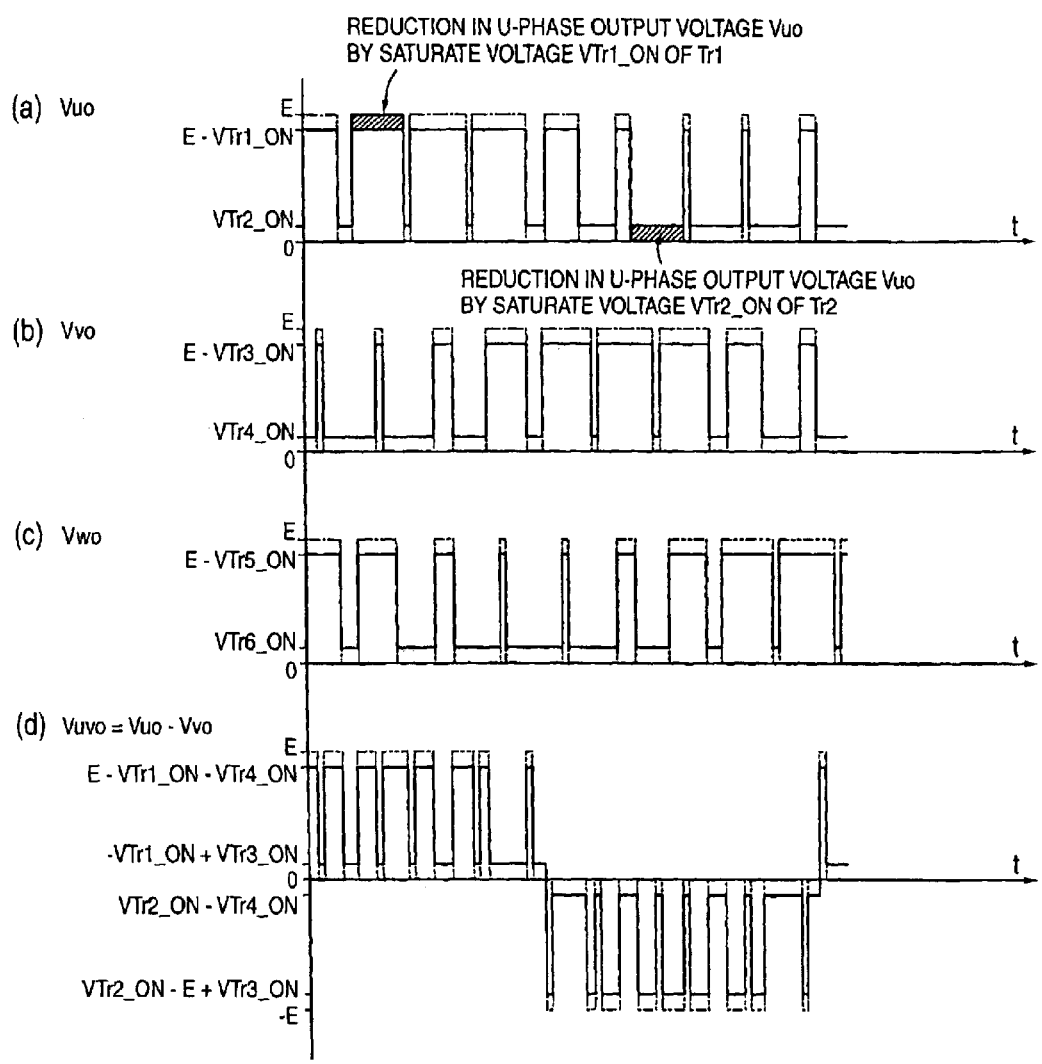
FIGS. 13(a) through (d) are views showing output voltages of the inverter device according to the related art.

Also, as shown in FIG. 13, the potentials Vu0, Vv0 of the point u, the point v at a time when the switching elements Tr1, Tr4 are turned ON are given by $$Vu0=E'-Tr1\_ON \quad (2)$$

$$Vv0=VTr4\_ON \quad (3)$$

and the output voltage Vuv0(=Vu0−Vv0) can be expressed by Eq. (4).

$$Vuv0 = (E' - VTr1\_ON) - VTr4\_ON \quad (4)$$

$$= E' - (VTr1\_ON + VTr4\_ON)$$

By substituting E' in Eq. (1) into Eq. (4), the output voltage Vuv0 is given by Eq. (5).

$$Vuv0 = E + Von(Tj\_Tr1, Iu1) + Von(Tj\_Tr4, Iu2) - \quad (5)$$
$$VTr1\_ON - VTr4\_ON$$

Here, since $Von(Tj\_Tr1, Iu1) \approx VTr1\_ON$ and $Von(Tj\_Tr4, Iu2) \approx VTr4\_ON$, Eq. (5) can be expressed by Eq. (6). the motor 36

$$Vuv0(=Vu0-Vv0) \approx E \quad (6)$$

Thus, the output voltage E as indicated by the command value can be obtained.

In contrast, assuming that the estimated saturation voltages of the switching elements Tr2, Tr3 are $Von(Tj\_Tr2, Iu2)$, $Von(Tj\_Tr3, Iv1)$ when the switching elements Tr2, Tr3 are turned ON, after performing the voltage compensation by adding these saturation voltages to the command voltages to the inverter, the input voltage E' can be expressed by Eq. (7).

$$E'=E+Von(Tj\_Tr2, Iu2)+Von(Tj\_Tr3, Iv1) \quad (7)$$

Also, as shown in FIG. 13, the potentials Vu0, Vv0 of the point u, the point v at a time when the switching elements Tr2, Tr3 are turned ON are given by $$Vu0=VTr2\_ON \quad (8)$$

$$Vv0=E'-VTr3\_ON \quad (9)$$

and the output voltage Vuv0(=Vu0-Vv0) can be expressed by Eq. (10).

$$Vuv0 = VTr2\_ON - (E' - VTr3\_ON) \quad (10)$$

$$= -E' + (VTr2\_ON + VTR3\_ON)$$

By substituting E' in Eq. (7) into Eq. (10), the output voltage Vuv0 is given by Eq. (11).

$$Vuv0 = -(E + Von(Tj\_Tr2, Iu2) + Von(Tj\_Tr3, Iv1)) + \quad (11)$$
$$VTr2\_ON + VTr3\_ON$$

Since $Von(Tj\_Tr2, Iu2) \approx VTr2\_ON$ and $Von(Tj\_Tr3, Iv1) \approx VTr3\_ON$, Eq. (11) can be expressed by Eq. (12). the motor 36

$$Vuv0(=Vu0-Vv0) \approx -E \quad (12)$$

Thus, the output voltage -E as indicated by the command value can be obtained.

A command voltage correcting portion 9 prepares a voltage, which is subjected to the saturation voltage compensation by adding the saturation voltage, which is estimated by the saturation voltage compensating unit 8a, to the command voltage to the inverter with utilizing the characteristic data of the switching elements, and then outputs the voltage to the CPU 40.

The CPU 40 receives various commands such as the operation command, the speed command, etc. and various set values such as the accelerating/decelerating time, the V/f pattern, etc. stored in the memory 41 as the input signals, calculates the output frequency and the output voltage, and outputs the switching signals Su1, Su2, Sv1, Sv2, Sw1, Sw2 to turn the switching elements of the inverter portion 2a ON/OFF.

The inverter portion 2a converts the DC power into the AC power having the variable frequency and the variable voltage by ON/OFF-controlling the switching elements Tr1, Tr2, Tr3, Tr4, Tr5, Tr6.

In the inverter device according to the embodiment 1, the saturation voltage estimation table that gives relationships between the temperatures of the switching elements, the current values of the switching elements, the temperatures of the free wheeling diodes, and the current values of the free wheeling diodes and the saturation voltages of the switching elements in the inverter operation is provided, and then the saturation voltages of the switching elements are estimated based on the temperatures of the switching elements, the current values of the switching elements, the temperatures of the free wheeling diodes, and the current values of the free wheeling diodes, which are detected in the inverter operation with utilizing this saturation voltage estimation table and then the estimated saturation voltage is employed in the control of the input voltage and the output voltage of the inverter. Therefore, the reduction in the output voltage of the inverter due to the saturation voltage of the switching elements can be prevented and thus the more precise voltage control can be achieved. In addition, since the influence of the saturation voltage can be reduced even in the low-speed operation range, the speed ripple can be reduced.

Embodiment 2

Figure 4:
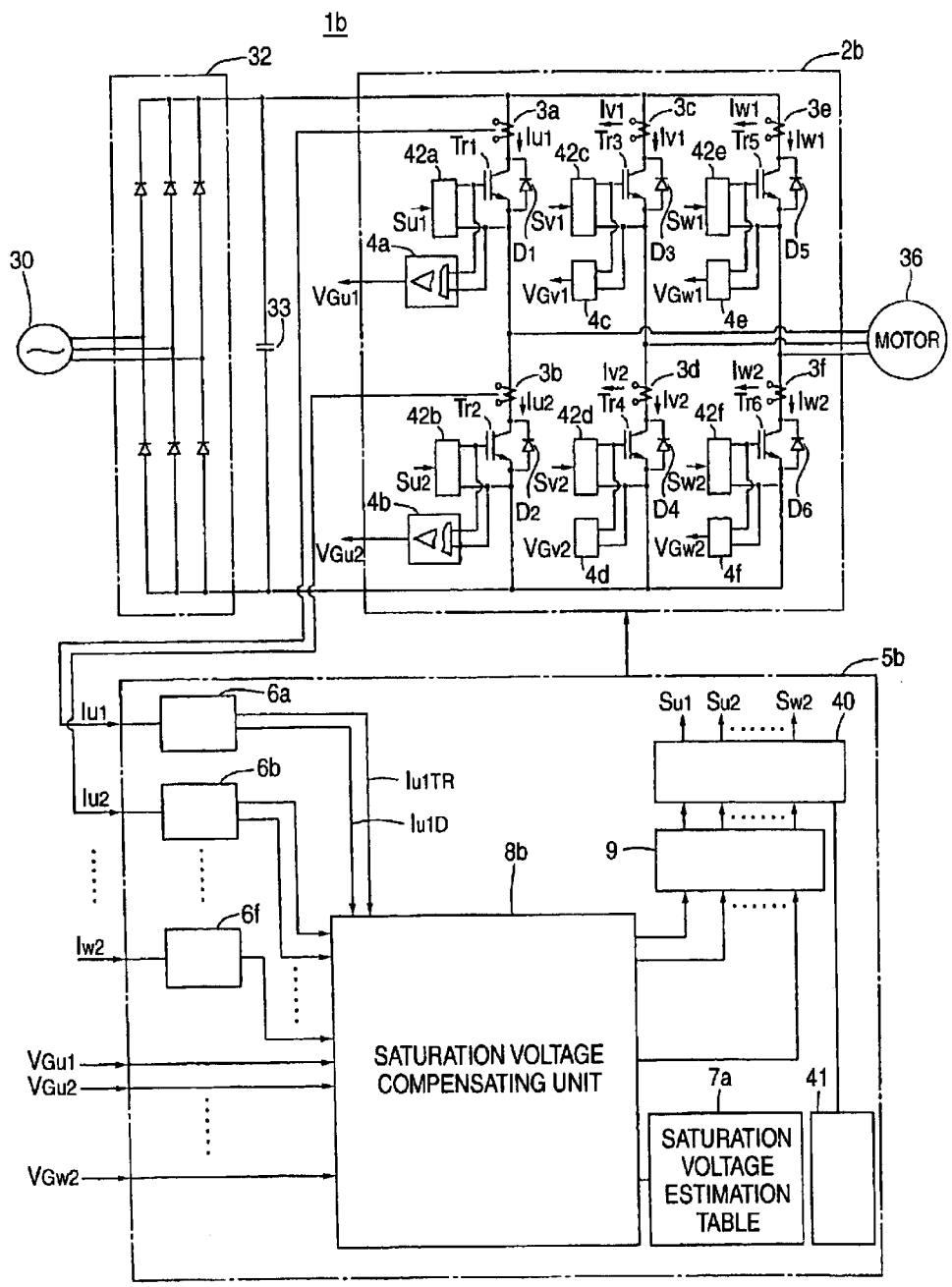
FIG. 4 is a view showing a configuration of an inverter device as a power converter device according to an embodiment 2 of the present invention.

FIG. 4 is a view showing a configuration of an inverter device as a power converter device according to an embodiment 2 of the present invention. In FIG. 4, reference numerals 3a to 3f, 6a to 6f, 9, 13, 14, 30, 32, 33, 36, 40, 41, 42a to 42f, Tr1 to Tr6, D1 to D6, Iu1, Iu2, Iv1, Iv2, Iw1, and Iw2 are similar to those in FIG. 1, and thus their explanation will be omitted. Also, reference numeral 1b is an inverter device, reference numeral 2b is an inverter portion, reference numeral 4a to 4f are gate voltage detecting circuit insulating circuits, and VGu1, Vgu2, VGv1, VGv2, VGw1, VGw2 are gate voltages.

Also, reference numeral 5b is a control portion for ON/OFF-controlling the switching elements in the inverter portion 2b. Also, reference numeral 7b is a saturation voltage estimation table for showing relationships between the temperature of the switching elements, the gate voltages of the switching elements, the temperatures of the free wheeling diode elements, and the current values of the switching elements, the free wheeling diode elements, and the gate voltages of the free wheeling diode elements and the saturation voltages of the switching elements in the inverter operation, and reference numeral 8b is a saturation voltage compensating unit.

Figure 5:
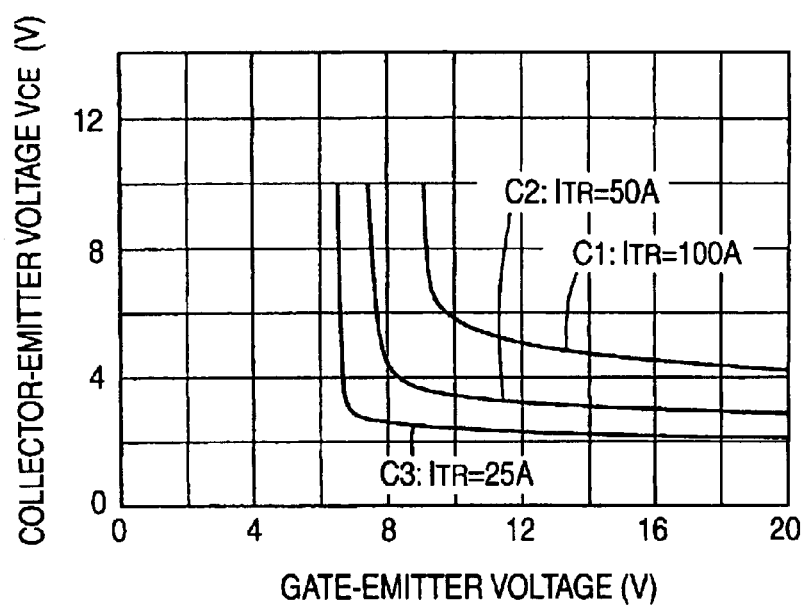
FIG. 5 is a view showing a saturation voltage estimation table in the inverter device according to the embodiment 2 of the present invention.

FIG. 5 is a view showing the saturation voltage estimation table in the inverter device according to the embodiment 2 of the present invention, and there is shown the case where the emitter is grounded and the substrate temperature Tc=125° C.

In FIG. 5, the collector-emitter voltage VCE in an ordinate that extends over a range of 12 V to 18 V of the gate-emitter voltage VGE in an abscissa is the saturation voltage as the ON-state voltage of the switching element. Also, c1 is a gate voltage/saturation voltage characteristic in the case that $I_{TR}$=100 A, c2 is a gate voltage/saturation voltage characteristic in the case that $I_{TR}$=50 A, and c3 is a gate voltage/saturation voltage characteristic in the case that $I_{TR}$=25 A.

In the case that $I_{TR}$=25 A, the saturation voltage is almost constant as 2.2 V. However, in the case that the load is heavy like $I_{TR}$=100 A, the variation becomes large as 4.4 V to 5 V and therefore the saturation voltage is estimated to take the gate-emitter voltage VGE into consideration, in the embodiment 2.

The saturation voltage estimation table 7b in the embodiment 2 is a (temperature-responsible) saturation voltage estimation table that indicates relationships among the gate voltages and the current values of the switching elements and the saturation voltages of the switching elements in the inverter operation, as shown in FIG. 5. The saturation voltage compensating unit 8b receives the temperatures Tj of the switching elements and the free wheeling diode elements sensed by the temperature sensors fitted to the switching elements 13 and the free wheeling diode elements 14 in the inverter operation, the current values ($I_{TR}$ or $I_D$) output from the current discriminating circuits 6a to 6f, and the gate voltages VGu1, Vgu2, VGv1, VGv2, VGw1, VGw2 sensed by the gate voltage detecting circuit insulating circuits 4a to 4f, then estimates the saturation voltages of the switching elements by using the saturation voltage estimation table 7b, and then generates the saturation voltage compensated voltage in which the command voltage to the inverter is compensated with the estimated saturation voltage.

In the above, there is explained the example wherein the temperature sensors are fitted to the switching elements and free wheeling diode elements, respectively in the inverter main circuit in which the switching elements and the free wheeling diode elements are composed of separate elements from each other. However, in the case of the integrated element in which the switching elements and the free wheeling diode elements are incorporated into one element, the temperature sensor is fitted every integrated element.

In the embodiment 2, the saturation voltage is estimated with taking the gate-emitter voltage into consideration. Therefore, even if the load is heavy and thus the saturation voltage is changed depending on the magnitude of the gate-emitter voltage in the ON-state of the switching elements, the saturation voltage can be compensated with good precision and the more precise voltage control can be achieved.

Embodiment 3

Figure 6:
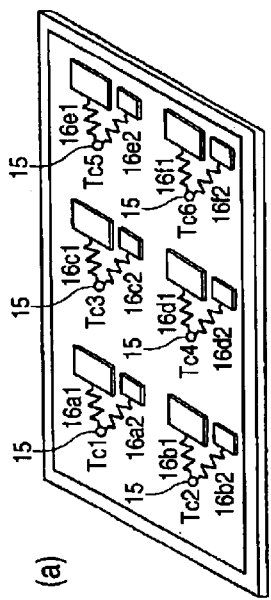
FIGS. 6(a) and (b) are views illustrating temperature measurement of a switching element and a free wheeling diode element in an inverter device according to an embodiment 3 of the present invention.
Figure 6:
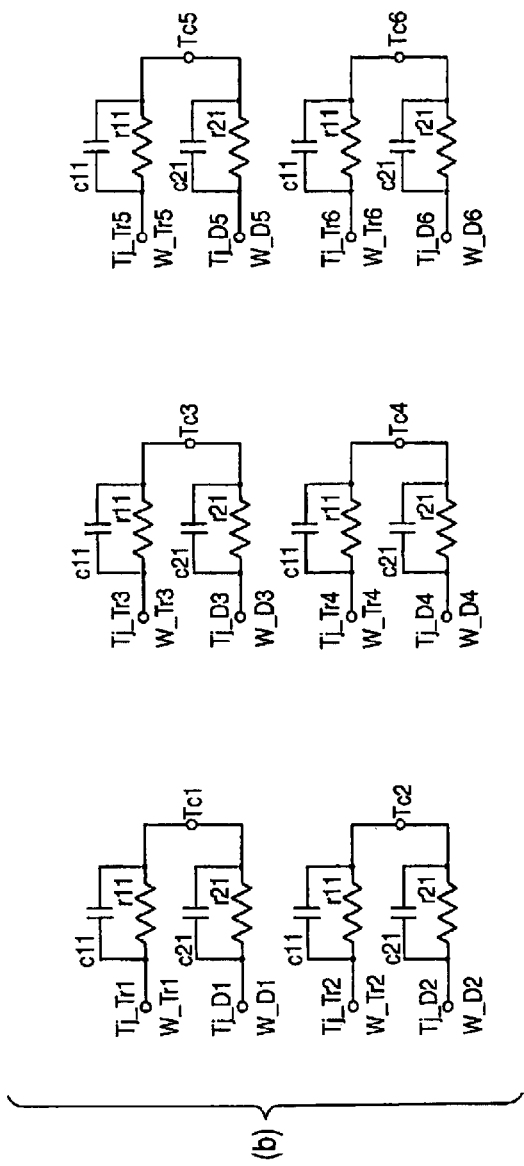

FIG. 6 is a view illustrating the temperature measurement of the switching element and the free wheeling diode element in an inverter device according to an embodiment 3 of the present invention, wherein (a) is a view showing an outer appearance of an inverter main circuit in which the temperature sensors are fitted in the vicinity of the switching elements and the free wheeling diode elements constituting a pair on the substrate on which the switching elements and the free wheeling diode elements are mounted, and (b) shows thermal resistance models.

In FIG. 6, reference numeral 15 is the temperature sensor, reference numerals 16 (16a1, 16a2, 16b1, 16b2, 16c1, 16c2, 16d1, 16d2, 16e1, 16e2, 16f1, 16f2) are thermal resistances, and Tc (Tc1, Tc2, Tc3, Tc4, Tc5, Tc6) are substrate temperatures.

Also, Tj_Tr (Tj_Tr1, Tj_Tr2, Tj_Tr3, Tj_Tr4, Tj_Tr5, Tj_Tr6) are temperatures of the switching elements, and Tj_D (Tj_D1, Tj_D2, Tj_D3, Tj_D4, Tj_D5, Tj_D6) are temperatures of the free wheeling diode elements. Also, W_Tr (W_Tr1, W_Tr2, W_Tr3, W_Tr4, W_Tr5, W_Tr6) are heating values (W) of the switching elements calculated based on the sensed currents, and W_D (W_D1, W_D2, W_D3, W_D4, W_D5, W_D6) are heating values (W) of the free wheeling diode elements calculated based on the sensed currents. Also, r11 is stationary thermal resistances (° C./W) between the switching elements and the substrate, r21 is stationary thermal resistances (° C./W) between the free wheeling diode elements and the substrate, c11 is transient thermal resistances (° C./W) between the switching elements and the substrate, and c21 is transient thermal resistances (° C./W) between the free wheeling diode elements and the substrate.

In the embodiment 1 and the embodiment 2, there is shown the example in which the temperature sensors are fitted to the switching elements (Tr1 to Tr6) and the free wheeling diode elements (D1 to D6) and then the temperatures of the switching elements (Tr1 to Tr6) 13 and the free wheeling diode elements (D1 to D6) 14 are directly sensed. However, in the embodiment 3, the temperature sensors are fitted in the vicinity of the switching elements (Tr1 to Tr6) and the free wheeling diode elements (D1 to D6) that constitute a pair on the substrate on which the switching elements and the free wheeling diode elements are mounted, and then the control portion estimates the temperatures of the switching elements (Tr1 to Tr6) and the free wheeling diode elements (D1 to D6) from the substrate temperature sensed by the temperature sensors based on the thermal resistance model.

In the embodiment 3, the temperatures Tj_Tr (Tj_Tr1, Tj_Tr2, Tj_Tr3, Tj_Tr4, Tj_Tr5, Tj_Tr6) of the switching elements and the temperatures Tj_D (Tj_D1, Tj_D2, Tj_D3, Tj_D4, Tj_D5, Tj_D6) of the free wheeling diode elements are estimated according to Eq. (13) and Eq. (14) based on the substrate temperatures Tc (Tc1, Tc2, Tc3, Tc4, Tc5, Tc6) sensed by the temperature sensors fitted in the vicinity of the switching elements and the free wheeling diode elements, which are arranged as pairs, on the substrate on which the switching elements and the free wheeling diode elements are mounted, the stationary thermal resistances r11, r21, the heating values W_Tr (W_Tr1, W_Tr2, W_Tr3, W_Tr4, W_Tr5, W_Tr6) of the switching elements calculated from the sensed currents, the heating values W_D (W_D1, W_D2, W_D3, W_D4, W_D5, W_D6) of the free wheeling diode elements calculated from the sensed currents.

$$Tj\_Tr = Tc + r11 \times W\_Tr \quad (13)$$

$$Tj\_D = Tc + r21 \times W\_D \quad (14)$$

For example, the temperature Tj_Tr1 of the switching element Tr1 is given by a following equation.

$$Tj\_Tr1 = Tc1 + r11 \times W\_Tr1$$

Also, the temperature Tj_D1 of the free wheeling diode element D1 is given by a following equation.

$$Tj\_D1 = Tc1 + r21 \times W\_D1$$

In the embodiment 3, the temperature sensors are fitted in the neighborhood of the switching elements and the free wheeling diode elements to be a pair on the substrate, and then the temperatures of the switching elements and the temperatures of the free wheeling diode elements are estimated based on the thermal resistance models. As a result, the fitting of the temperature sensors can be facilitated.

Embodiment 4

Figure 7:
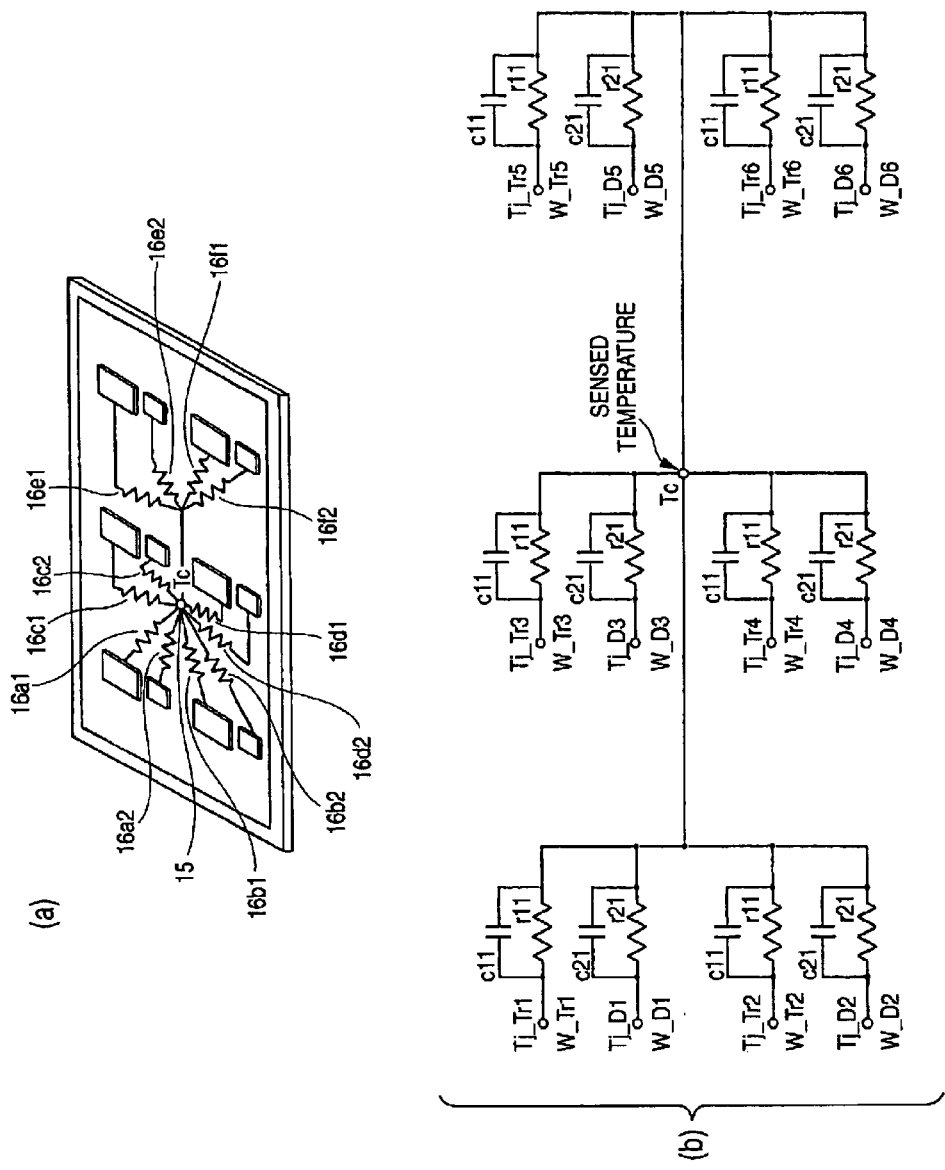
FIGS. 7(a) and (b) are views illustrating temperature measurement of a switching element and a free wheeling diode element in an inverter device according to an embodiment 4 of the present invention.

FIG. 7 is a view illustrating temperature measurement of a switching element and a free wheeling diode element in an inverter device according to an embodiment 4 of the present invention, wherein (a) is a view showing an outer appearance of an inverter main circuit in which the temperature sensor is fitted to one location of the substrate on which the switching elements and the free wheeling diode elements are mounted, and (b) is thermal resistance models.

In FIG. 7, reference numeral 15 is the temperature sensor, reference numerals 16 (16a1, 16a2, 16b1, 16b2, 16c1, 16c2, 16d1, 16d2, 16e1, 16e2, 16f1, 16f2) are thermal resistances, and Tc is the substrate temperature sensed by the temperature sensor that is fitted to one location on the substrate on which the switching elements and the free wheeling diode elements are mounted.

Also, Tj_Tr (Tj_Tr1, Tj_Tr2, Tj_Tr3, Tj_Tr4, Tj_Tr5, Tj_Tr6) are temperatures of the switching elements, and Tj_D (Tj_D1, Tj_D2, Tj_D3, Tj_D4, Tj_D5, Tj_D6) are temperatures of the free wheeling diode elements. Also, W_Tr (W_Tr1, W_Tr2, W_Tr3, W_Tr4, W_Tr5, W_Tr6) are heating values (W) of the switching elements calculated based on the sensed currents, and W_D (W_D1, W_D2, W_D3, W_D4, W_D5, W_D6) are heating values (W) of the free wheeling diode elements calculated based on the sensed currents. Also, r11 is the stationary thermal resistances (° C./W) between the switching elements and the substrate, r21 is the stationary thermal resistances (° C./W) between the free wheeling diode elements and the substrate, c11 is the transient thermal resistances (° C./W) between the switching elements and the substrate, and c21 is the transient thermal resistances (° C./W) between the free wheeling diode elements and the substrate.

In the embodiment 3, there is shown the example in which the temperature sensors are fitted in vicinity of the switching elements and the free wheeling diode elements constituting a pair on the substrate on which the switching elements and the free wheeling diode elements are mounted. In the embodiment 4, the temperature sensor is fitted to one location on the substrate on which the switching elements and the free wheeling diode elements are mounted.

In the embodiment 4, the temperatures Tj_Tr (Tj_Tr1, Tj_Tr2, Tj_Tr3, Tj_Tr4, Tj_Tr5, Tj_Tr6) of the switching elements and the temperatures Tj_D (Tj_D1, Tj_D2, Tj_D3, Tj_D4, Tj_D5, Tj_D6) of the free wheeling diode elements are estimated according to Eq. (13) and Eq. (14) based on the substrate temperature Tc sensed by the temperature sensors fitted to one location on the substrate on which the switching elements and the free wheeling diode elements are mounted, the stationary thermal resistances r11, r21, the heating values W_Tr (W_Tr1, W_Tr2, W_Tr3, W_Tr4, W_Tr5, W_Tr6) of the switching elements calculated based on the sensed currents, and the heating values W_D (W_D1, W_D2, W_D3, W_D4, W_D5, W_D6) of the free wheeling diode elements calculated based on the sensed currents as with like the embodiment 3.

$$Tj\_Tr = Tc + r11 \times W\_Tr \quad (13)$$

$$Tj\_D = Tc + r21 \times W\_D \quad (14)$$

For example, the temperature Tj_Tr1 of the switching element Tr1 is given by a following equation.

$$Tj\_Tr1 = Tc + r11 \times W\_Tr1$$

Also, the temperature Tj_D1 of the free wheeling diode element D1 is given by a following equation.

$$Tj\_D1 = Tc + r21 \times W\_D1$$

In the embodiment 4, the temperature sensor is fitted to one location of the substrate on which the switching elements and the free wheeling diode elements are mounted, and then the temperatures of the switching elements and the temperatures of the free wheeling diode elements are estimated based on the thermal resistance models. As a result, the fitting of the temperature sensor can be made much more easy.

Embodiment 5

Figure 8:
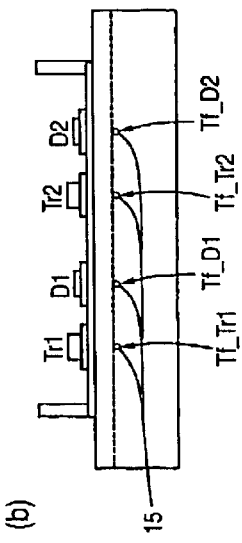
FIGS. 8(A) through (C) are views illustrating temperature measurement of a switching element and a free wheeling diode element in an inverter device according to an embodiment 5 of the present invention.
Figure 8:
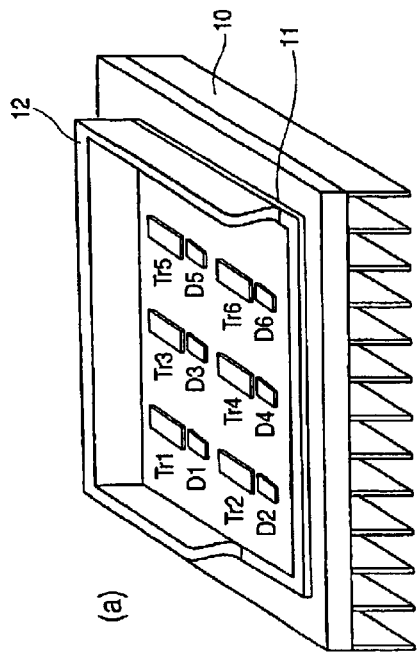
Figure 8:
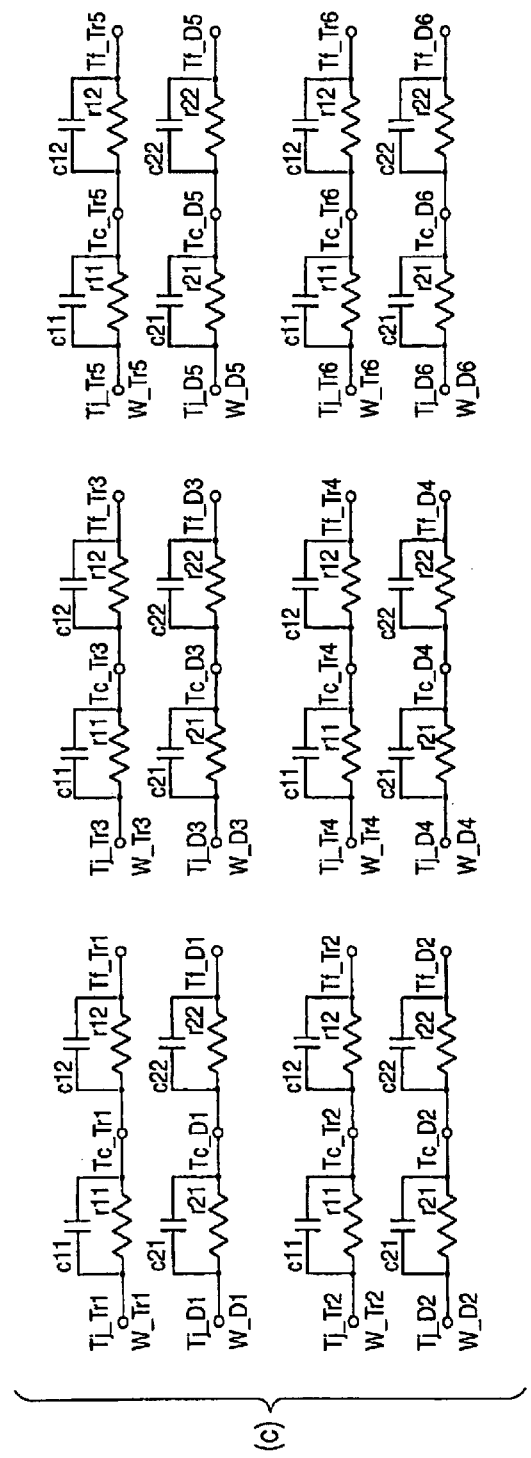

FIG. 8 is a view illustrating the temperature measurement of the switching element and the free wheeling diode element in an inverter device according to an embodiment 5 of the present invention, wherein (a) is a view showing an outer appearance of an inverter main circuit, (b) is a view showing a sectional shape of the inverter main circuit in which the temperature sensors are fitted to portions of a cooling fin corresponding to the switching elements and the free wheeling diode elements, respectively, and (c) is thermal resistance models. Here, FIG. 8(b) shows an example in which the temperature sensors are fitted to the cooling fin under the switching elements (Tr1, Tr2) and the free wheeling diode elements (D1, D2).

In FIG. 8, reference numeral 10 is the cooling fin, reference numeral 11 is the main circuit substrate, reference numeral 12 is the case, reference numeral 15 is the temperature sensor, Tr1 to Tr6 are the switching elements, and D1 to D6 are the free wheeling diode elements.

Also, Tf_Tr (Tf_Tr1, Tf_Tr2, Tf_Tr3, Tf_Tr4, Tf_Tr5, Tf_Tr6) are fin temperatures corresponding to the switching elements sensed by the temperature sensors, Tf_D (Tf_D1, Tf_D2, Tf_D3, Tf_D4, Tf_D5, Tf_D6) are fin temperatures corresponding to the free wheeling diode elements sensed by the temperature sensors, Tc_Tr (Tc_Tr1, Tc_Tr2, Tc_Tr3, Tc_Tr4, Tc_Tr5, Tc_Tr6) are substrate temperatures corresponding to the switching elements, and Tc_D (Tc_D1, Tc_D2, Tc_D3, Tc_D4, Tc_D5, Tc_D6) are substrate temperatures corresponding to the free wheeling diode elements.

Also, Tj_Tr (Tj_Tr1, Tj_Tr2, Tj_Tr3, Tj_Tr4, Tj_Tr5, Tj_Tr6) are the temperatures of the switching elements, and Tj_D (Tj_D1, Tj_D2, Tj_D3, Tj_D4, Tj_D5, Tj_D6) are the temperatures of the free wheeling diode elements. Also, W_Tr (W_Tr1, W_Tr2, W_Tr3, W_Tr4, W_Tr5, W_Tr6) are heating values (W) of the switching elements calculated based on the sensed currents, and W_D (W_D1, W_D2, W_D3, W_D4, W_D5, W_D6) are heating values (W) of the free wheeling diode elements calculated based on the sensed currents. Also, r11 is the stationary thermal resistances (° C./W) between the switching elements and the substrate, r21 is the stationary thermal resistances (° C./W) between the free wheeling diode elements and the substrate, r12 is a stationary thermal resistance (° C./W) between the fin and the substrate, and r22 is a stationary thermal resistance (° C./W) between the fin and the substrate. Also, c11 is the transient thermal resistances (° C./W) between the switching elements and the substrate, c21 is the transient thermal resistances (° C./W) between the free wheeling diode elements and the substrate, c12 is a transient thermal resistance (° C./W) between the fin and the substrate, and c22 is a transient thermal resistance (° C./W) between the fin and the substrate.

In the embodiment 5, the temperatures Tj_Tr (Tj_Tr1, Tj_Tr2, Tj_Tr3, Tj_Tr4, Tj_Tr5, Tj_Tr6) of the switching elements and the temperatures Tj_D (Tj_D1, Tj_D2, Tj_D3, Tj_D4, Tj_D5, Tj_D6) of the free wheeling diode elements are estimated according to Eq. (15) and Eq. (16) based on the fin temperatures Tf_Tr (Tf_Tr1, Tf_Tr2, Tf_Tr3, Tf_Tr4, Tf_Tr5, Tf_Tr6) corresponding to the switching elements sensed by the temperature sensors, the fin temperatures Tf_D (Tf_D1, Tf_D2, Tf_D3, Tf_D4, Tf_D5, Tf_D6) corresponding to the free wheeling diode elements sensed by the temperature sensors, the stationary thermal resistances r11, r21, the heating values W_Tr (W_Tr1, W_Tr2, W_Tr3, W_Tr4, W_Tr5, W_Tr6) of the switching elements calculated based on the sensed currents, and the heating values W_D (W_D1, W_D2, W_D3, W_D4, W_D5, W_D6) of the free wheeling diode elements calculated based on the sensed currents.

$$Tj\_Tr = Tf\_Tr + (r11+r12) \times W\_Tr \quad (15)$$

$$Tj\_D = Tf\_D + (r21+r22) \times W\_D \quad (16)$$

For example, the temperature Tj_Tr1 of the switching element Tr1 is given by a following equation.

$$Tj\_Tr1 = Tf\_Tr1 + (r11+r12) \times W\_Tr1$$

Also, the temperature Tj_D1 of the free wheeling diode element D1 is given by a following equation.

$$Tj\_D1 = Tf\_D1 + (r21+r22) \times W\_D1$$

In the embodiment 5, the temperature sensors are fitted to the cooling fin at the locations corresponding to the switching elements and the free wheeling diode elements respectively, and then the temperatures of the switching elements and the temperatures of the free wheeling diode elements are estimated based on the thermal resistance models. As a result, the fitting of the temperature sensors can be further facilitated.

Embodiment 6

Figure 9:
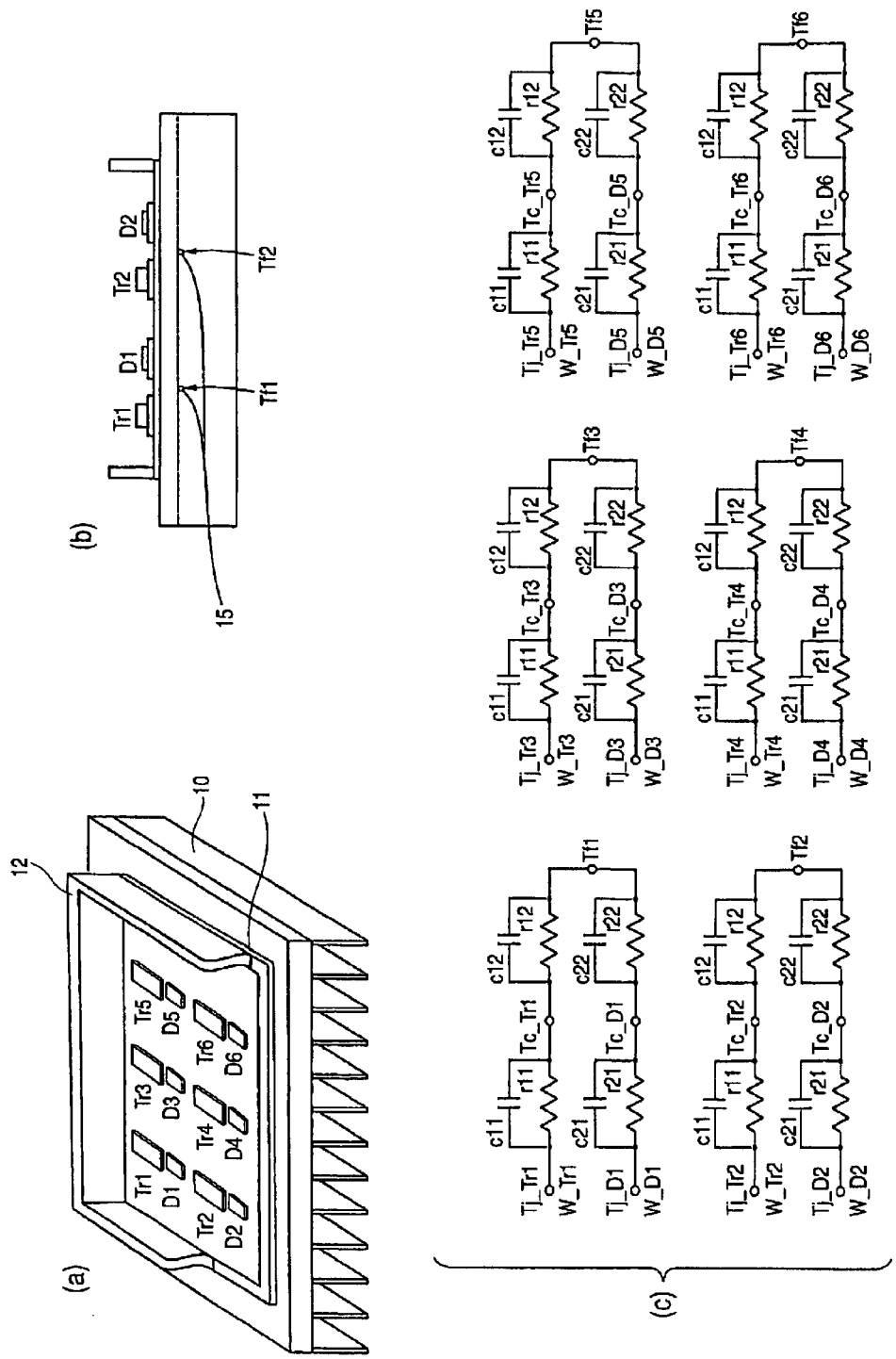
FIGS. 9(a) through (c) are views illustrating temperature measurement of a switching element and a free wheeling diode element in an inverter device according to an embodiment 6 of the present invention.

FIG. 9 is a view illustrating the temperature measurement of the switching element and the free wheeling diode element in an inverter device according to an embodiment 6 of the present invention, wherein (a) is a view showing an outer appearance of the inverter main circuit, (b) is a view showing a sectional shape of the inverter main circuit in which the temperature sensors are fitted to the cooling fin to correspond to the switching elements and the free wheeling diode elements that constitute pairs, and (c) is the thermal resistance models. FIG. 9(b) shows an example in which the temperature sensors are fitted to the cooling fin under the switching element Tr1 and the free wheeling diode element D1 constituting a pair, and under the switching element Tr2 and the free wheeling diode element D2 constituting a pair.

In FIG. 9, reference numeral 10 is the cooling fin, reference numeral 11 is the main circuit substrate, reference numeral 12 is the case, reference numeral 15 is the temperature sensor, Tr1 to Tr6 are the switching elements, and D1 to D6 are the free wheeling diode elements.

Also, Tf (Tf1, Tf2, Tf3, Tf4, Tf5, Tf6) are the fin temperatures sensed by the temperature sensors, Tc_Tr (Tc_Tr1, Tc_Tr2, Tc_Tr3, Tc_Tr4, Tc_Tr5, Tc_Tr6) are the substrate temperatures corresponding to the switching elements, and Tc_D (Tc_D1, Tc_D2, Tc_D3, Tc_D4, Tc_D5, Tc_D6) are the substrate temperatures corresponding to the free wheeling diode elements.

Also, Tj_Tr (Tj_Tr1, Tj_Tr2, Tj_Tr3, Tj_Tr4, Tj_Tr5, Tj_Tr6) are the temperatures of the switching elements, and Tj_D (Tj_D1, Tj_D2, Tj_D3, Tj_D4, Tj_D5, Tj_D6) are the temperatures of the free wheeling diode elements. Also, W_Tr (W_Tr1, W_Tr2, W_Tr3, W_Tr4, W_Tr5, W_Tr6) are the heating values (W) of the switching elements calculated based on the sensed currents, and W_D (W_D1, W_D2, W_D3, W_D4, W_D5, W_D6) are the heating values (W) of the free wheeling diode elements calculated based on the sensed currents. Also, r11 is the stationary thermal resistances (° C./W) between the switching elements and the substrate, r21 is the stationary thermal resistances (° C./W) between the free wheeling diode elements and the substrate, r12 is the stationary thermal resistance (° C./W) between the fin and the substrate, and r22 is the stationary thermal resistance (° C./W) between the fin and the substrate. Also, c11 is the transient thermal resistances (° C./W) between the switching elements and the substrate, c21 is the transient thermal resistances (° C./W) between the free wheeling diode elements and the substrate, c12 is the transient thermal resistance (° C./W) between the fin and the substrate, and c22 is the transient thermal resistance (° C./W) between the fin-the substrate.

In the embodiment 5, there is shown the example in which the temperature sensors are fitted to the cooling fin to correspond to the switching elements and the free wheeling diode elements respectively. However, in the embodiment 6, the temperature sensors are fitted to the cooling fin to correspond to the switching elements and the free wheeling diode elements that constitute pairs.

In the embodiment 6, the temperatures Tj_Tr (Tj_Tr1, Tj_Tr2, Tj_Tr3, Tj_Tr4, Tj_Tr5, Tj_Tr6) of the switching elements and the temperatures Tj_D (Tj_D1, Tj_D2, Tj_D3, Tj_D4, Tj_D5, Tj_D6) of the free wheeling diode elements are estimated according to Eq. (17) and Eq. (18) based on the fin temperatures Tf (Tf1, Tf2, Tf3, Tf4, Tf5, Tf6) sensed by the temperature sensors, the stationary thermal resistances r11, r12, r21, r22, the heating values W_Tr (W_Tr1, W_Tr2, W_Tr3, W_Tr4, W_Tr5, W_Tr6) of the switching elements calculated based on the sensed currents, and the heating values W_D (W_D1, W_D2, W_D3, W_D4, W_D5, W_D6) of the free wheeling diode elements calculated based on the sensed currents.

$$Tj\_Tr = Tf + (r11+r12) \times W\_Tr \quad (17)$$

$$Tj\_D = Tf + (r21+r22) \times W\_D \quad (18)$$

For example, the temperature Tj_Tr1 of the switching element Tr1 is given by a following equation.

$$Tj\_Tr1 = Tf + (r11+r12) \times W\_Tr1$$

Also, the temperature Tj_D1 of the free wheeling diode element D1 is given by a following equation.

$$Tj\_D1 = Tf + (r21+r22) \times W\_D1$$

In the embodiment 6, the temperature sensors are fitted to the cooling fin so as to correspond to the switching elements and the free wheeling diode elements constituting pairs, and then the temperatures of the switching elements and the temperatures of the free wheeling diode elements are estimated based on the thermal resistance models. As a result, the fitting of the temperature sensors can be much more facilitated.

Embodiment 7

Figure 10:
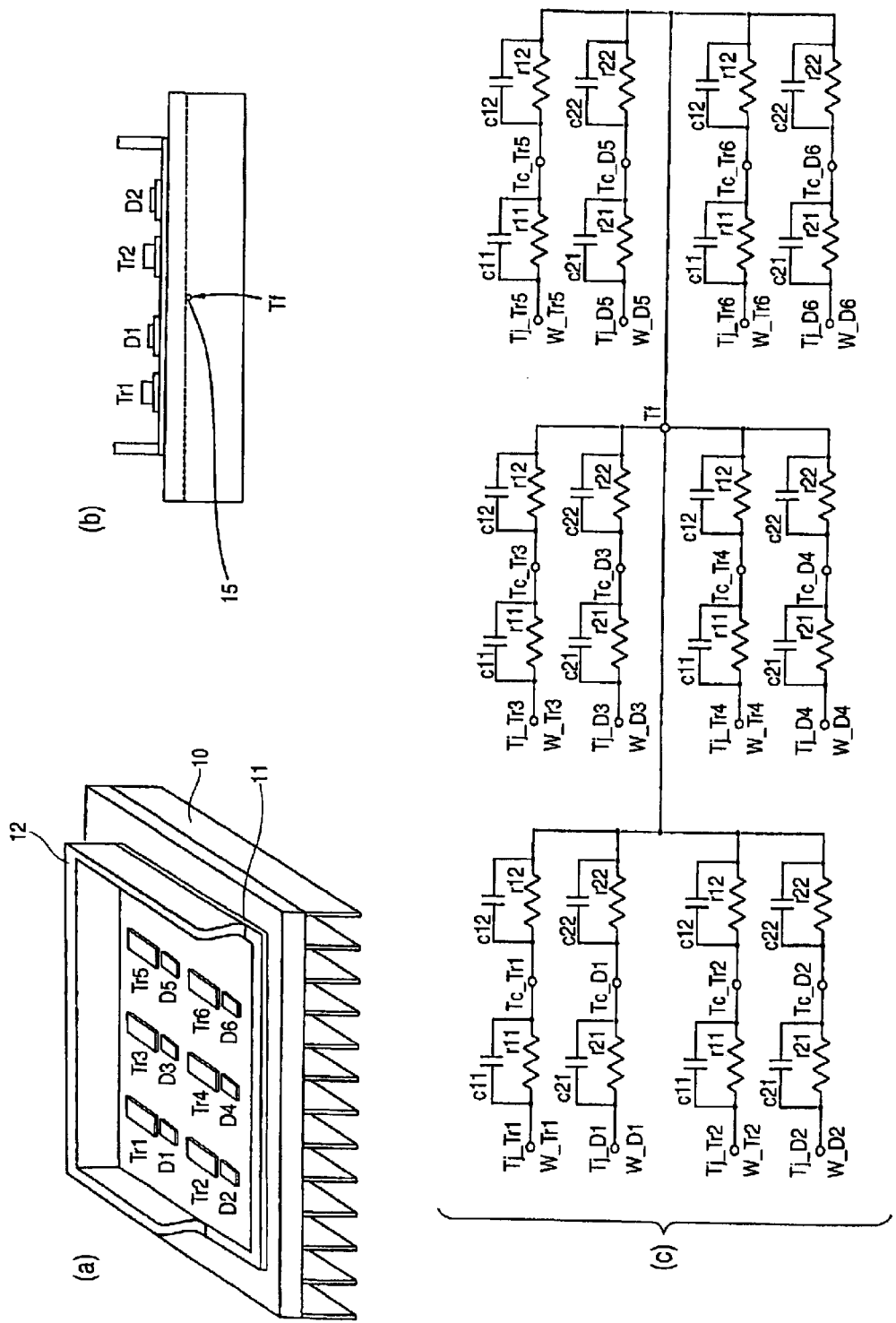
FIGS. 10(a) through (c) are views illustrating temperature measurement of a switching element and a free wheeling diode element in an inverter device according to an embodiment 7 of the present invention.

FIG. 10 is a view illustrating the temperature measurement of the switching element and the free wheeling diode element in an inverter device according to an embodiment 7 of the present invention, wherein (a) is a view showing an outer appearance of the inverter main circuit, (b) is a view showing a sectional shape of the inverter main circuit in which the temperature sensor is fitted to one location of the cooling fin, and (c) is the thermal resistance models.

In FIG. 10, reference numeral 10 is the cooling fin, reference numeral 11 is the main circuit substrate, reference numeral 12 is the case, 15 is the temperature sensor, Tr1 to Tr6 are the switching elements, and D1 to D6 are the free wheeling diode elements.

Also, Tf is the fin temperature sensed by the temperature sensor, Tc_Tr (Tc_Tr1, Tc_Tr2, Tc_Tr3, Tc_Tr4, Tc_Tr5, Tc_Tr6) are the substrate temperatures corresponding to the switching elements, and Tc_D (Tc_D1, Tc_D2, Tc_D3, Tc_D4, Tc_D5, Tc_D6) are the substrate temperatures corresponding to the free wheeling diode elements.

Also, Tj_Tr (Tj_Tr1, Tj_Tr2, Tj_Tr3, Tj_Tr4, Tj_Tr5, Tj_Tr6) are the temperatures of the switching elements, and Tj_D (Tj_D1, Tj_D2, Tj_D3, Tj_D4, Tj_D5, Tj_D6) are the temperatures of the free wheeling diode elements. Also, W_Tr (W_Tr1, W_Tr2, W_Tr3, W_Tr4, W_Tr5, W_Tr6) are the heating values (W) of the switching elements calculated based on the sensed current, and W_D (W_D1, W_D2, W_D3, W_D4, W_D5, W_D6) are the heating values (W) of the free wheeling diode elements calculated based on the sensed current. Also, r11 is the stationary thermal resistances (° C./W) between the switching elements and the substrate, r21 is the stationary thermal resistances (° C./W) between the free wheeling diode elements and the substrate, r12 is the stationary thermal resistance (° C./W) between the fin and the substrate, and r22 is the stationary thermal resistance (° C./W) between the fin and the substrate. Also, c11 is the transient thermal resistances (° C./W) between the switching elements and the substrate, c21 is the transient thermal resistances (° C./W) between the free wheeling diode elements and the substrate, c12 is the transient thermal resistance (° C./W) between the fin and the substrate, and c22 is the transient thermal resistance (° C./W) between the fin and the substrate.

In the embodiment 6, there is shown the example in which the temperature sensors are fitted to the cooling fin to correspond to the switching elements and the free wheeling diode elements, which constitute pairs. However, in the embodiment 7, the temperature sensor is fitted to one location of the cooling fin.

In the embodiment 7, the temperatures Tj_Tr (Tj_Tr1, Tj_Tr2, Tj_Tr3, Tj_Tr4, Tj_Tr5, Tj_Tr6) of the switching elements and the temperatures Tj_D (Tj_D1, Tj_D2, Tj_D3, Tj_D4, Tj_D5, Tj_D6) of the free wheeling diode elements are estimated according to Eq. (19) and Eq. (20) based on the fin temperatures Tf sensed by the temperature sensor, the stationary thermal resistances r11, r12, the heating values W_Tr (W_Tr1, W_Tr2, W_Tr3, W_Tr4, W_Tr5, W_Tr6) of the switching elements calculated based on the sensed current, and the heating values W_D (W_D1, W_D2, W_D3, W_D4, W_D5, W_D6) of the free wheeling diode elements calculated based on the sensed current.

$$Tj\_Tr = Tf + (r11 + r12) \times W\_Tr \quad (19)$$

$$Tj\_D = Tf + (r21 + r22) \times W\_D \quad (20)$$

For example, the temperature Tj_Tr1 of the switching element Tr1 is given by a following equation.

$$Tj\_Tr1 = Tf + (r11 + r12) \times W\_Tr1$$

Also, the temperature Tj_D1 of the free wheeling diode element D1 is given by a following equation.

$$Tj\_D1 Tf + (r21 + r22) \times W\_D1 \quad (60)$$

In the embodiment 7, the temperature sensor is fitted to one location of the cooling fin, and then the temperatures of the switching elements and the temperatures of the free wheeling diode elements are estimated based on the thermal resistance models. As a result, the fitting of the temperature sensors becomes easy much more.

Industrial Applicability

As described above, the power converter device according to the present invention can estimate the saturation voltages of respective switching elements and execute the power conversion to output the command voltage with good precision. Therefore, the power converter device is suitable for the applications such as the conveyer, the carriage, etc. in which such power converter device is employed in the low-speed operation range.

What is claimed is:

1. A power converter device comprising:
   an inverter portion having a switching element and a free wheeling diode element, the inverter portion for converting a DC power into an AC power;
   a control portion for ON/OFF-controlling the switching elements of the inverter portion; and
   a current sensor for sensing current flowing through one of the switching element and the free wheeling diode element,
   wherein the control portion comprises:
      a current discriminating circuit for discriminating that sensed currents sensed by the current sensors are either current flowing through the switching elements or current flowing through the free wheeling diode elements;
      a saturation voltage estimation table for showing relationships between temperature of the switching element, current value of the switching element, temperature of the free wheeling element, and current value of the free wheeling element and saturation voltages of the switching elements; and
      a saturation voltage compensating unit for receiving the temperature of the switching element and the current discriminated by the current discriminating circuit, estimating a saturation voltage of the switching element by using the saturation voltage estimation table, and forming saturation voltage compensated voltage in which a command voltage to an inverter is compensated with the estimated saturation voltage, and
   wherein the switching elements of the inverter portion are ON/OFF-controlled based on the saturation voltage compensated voltage.

2. A power converter device comprising:
   an inverter portion having a switching element and a free wheeling diode element, the inverter portion for converting a DC power into an AC power;
   a control portion for ON/OFF-controlling the switching elements of the inverter portion; and
   a gate voltage detecting circuit insulating circuit for detecting gate voltage of the switching element,
   wherein the control portion comprises:
      a current discriminating circuit for discriminating that sensed currents sensed by the current sensors are either current flowing through the switching elements or current flowing through the free wheeling diode elements;
      a saturation voltage estimation table for showing relationships between temperature of the switching element, current value of the switching element, temperature of the free wheeling element, and current value of the free wheeling element and saturation voltages of the switching elements; and
      a saturation voltage compensating unit for receiving the gate voltage of the switching element and the current discriminated by the current discriminating circuit, estimating a saturation voltage of the switching element by using the saturation voltage estimation table, and forming saturation voltage compensated voltage in which a command voltage to an inverter is compensated with the estimated saturation voltage, and wherein the switching elements of the inverter portion are ON/OFF-controlled based on the saturation voltage compensated voltage.

3. The power converter device according to claim 1, wherein temperature sensors are fitted to the switching element and the free wheeling diode element to sense temperature of the switching element and temperature of the free wheeling diode element.

4. The power converter device according to claim 1, wherein temperature sensor is fitted in the vicinity of the switching element and the free wheeling diode element, which constitute a pair, on a substrate on which the switching element and the free wheeling diode element are mounted; and wherein the control portion estimates temperature of the switching element and temperature of the free wheeling diode element based on substrate temperature sensed by the temperature sensor, stationary thermal resistance between the switching element and the substrate, stationary thermal resistances between the free wheeling diode element and the substrate, heating value of the switching element calculated based on the sensed current, and heating value of the free wheeling diode element calculated based on the sensed current.

5. The power converter device according to claim 1, wherein a temperature sensor is fitted to one location on a substrate on which the switching element and the free wheeling diode element are mounted; and wherein the control portion estimates temperature of the switching element and temperature of the free wheeling diode element based on substrate temperature sensed by the temperature sensor, stationary thermal resistance between the switching element and the substrate, stationary thermal resistances between the free wheeling diode element and the substrate, heating value of the switching element calculated based on the sensed current, and heating value of the free wheeling diode element calculated based on the sensed current.

6. The power converter device according to claim 1, wherein temperature sensors are fitted to a location on a fin fitted to a substrate on which the switching element and the free wheeling diode element are mounted, the location corresponding to the switching element and the free wheeling diode element; and wherein the control portion estimates temperature of the switching element and the free wheeling diode element based on substrate temperature sensed by the temperature sensors, stationary thermal resistance between the switching element and the substrate, stationary thermal resistance between the fin and the substrate, stationary thermal resistance between the free wheeling diode element and the substrate, the stationary thermal resistance between the fin-the substrate and heating values of the switching element calculated based on the sensed currents, and heating values of the free wheeling diode element.

7. The power converter device according to claim 1, wherein temperature sensor are fitted to a location on a fin fitted to a substrate on which the switching element and the free wheeling diode element are mounted, the location corresponding to a pair of the switching element and the free wheeling diode element; and wherein the control portion estimates temperature of the switching element and temperature of the free wheeling diode element based on fin temperature sensed by the temperature sensor, stationary thermal resistances between the switching element and the substrate, a stationary thermal resistance between the fin and the substrate, stationary thermal resistances between the free wheeling diode element and the substrate, the stationary thermal resistance between the fin and the substrate, heating value of the switching element calculated based on the sensed current, and heating value of the free wheeling diode element calculated based on the sensed current.

8. The power converter device according to claim 1, wherein temperature sensor is fitted to one location on a fin that is fitted to a substrate on which the switching element and the free wheeling diode element are mounted; and wherein the control portion estimates temperature of the switching element and temperature of the free wheeling diode element based on substrate temperature sensed by the temperature, stationary thermal resistances between the switching element and the substrate, stationary thermal resistance between the fin and the substrate, stationary thermal resistances between the free wheeling diode element and the substrate, stationary thermal resistance between the fin and the substrate, heating value of the switching element calculated based on the sensed current, and heating value of the free wheeling diode element based on the sensed current.

9. The power converter device according to claim 2, wherein temperature sensors are fitted to the switching element and the free wheeling diode element to sense temperature of the switching element and temperature of the free wheeling diode element.

10. The power converter device according to claim 2, wherein temperature sensor is fitted in the vicinity of the switching element and the free wheeling diode element, which constitute a pair, on a substrate on which the switching element and the free wheeling diode element are mounted; and wherein the control portion estimates temperature of the switching element and temperature of the free wheeling diode element based on substrate temperature sensed by the temperature sensor, stationary thermal resistance between the switching element and the substrate, stationary thermal resistances between the free wheeling diode element and the substrate, heating value of the switching element calculated based on the sensed current, and heating value of the free wheeling diode element calculated based on the sensed current.

11. The power converter device according to claim 1, wherein a temperature sensor is fitted to one location on a substrate on which the switching element and the free wheeling diode element are mounted; and wherein the control portion estimates temperature of the switching element and temperature of the free wheeling diode element based on substrate temperature sensed by the temperature sensor, stationary thermal resistance between the switching element and the substrate, stationary thermal resistances between the free wheeling diode element and the substrate, heating value of the switching element calculated based on the sensed current, and heating value of the free wheeling diode element calculated based on the sensed current.

12. The power converter device according to claim 2, wherein temperature sensors are fitted to a location on a fin fitted to a substrate on which the switching element and the free wheeling diode element are mounted, the location corresponding to the switching element and the free wheeling diode element; and wherein the control portion estimates temperature of the switching element and the free wheeling diode element based on fin temperature sensed by the temperature sensors, stationary thermal resistance between the switching element and the substrate, stationary thermal resistance between the fin and the substrate, stationary thermal resistance between the free wheeling diode element and the substrate, the stationary thermal resistance between the fin-the substrate and heating values of the switching element calculated based on the sensed currents, and heating values of the free wheeling diode element.

13. The power converter device according to claim 2, wherein temperature sensor are fitted to a location on a fin fitted to a substrate on which the switching element and the free wheeling diode element are mounted, the location corresponding to a pair of the switching element and the free wheeling diode element; and wherein the control portion estimates temperature of the switching element and temperature of the free wheeling diode element based on fin temperature sensed by the temperature sensor, stationary thermal resistances between the switching element and the substrate, a stationary thermal resistance between the fin and the substrate, stationary thermal resistances between the free wheeling diode element and the substrate, the stationary thermal resistance between the fin and the substrate, heating value of the switching element calculated based on the sensed current, and heating value of the free wheeling diode element calculated based on the sensed current.

14. The power converter device according to claim 2, wherein temperature sensor is fitted to one location on a fin that is fitted to a substrate on which the switching element and the free wheeling diode element are mounted; and wherein the control portion estimates temperature of the switching element and temperature of the free wheeling diode element based on substrate temperature sensed by the temperature, stationary thermal resistances between the switching element and the substrate, stationary thermal resistance between the fin and the substrate, stationary thermal resistances between the free wheeling diode element and the substrate, stationary thermal resistance between the fin and the substrate, heating value of the switching element calculated based on the sensed current, and heating value of the free wheeling diode element based on the sensed current.

* * * * *

UNITED STATES PATENT AND TRADEMARK OFFICE
CERTIFICATE OF CORRECTION

PATENT NO.    : 6,747,884 B2
DATED         : June 8, 2004
INVENTOR(S)   : Yuji Nishizawa, Akira Hatai and Kei Terada It is certified that error appears in the above-identified patent and that said Letters Patent is hereby corrected as shown below:

Column 19,
Line 53, delete "substrate temperature" and insert -- fin temperatures --.

Column 20,
Line 23, delete "substrate" and insert -- fin --.

Column 21,
Line 9, delete "temperature" and insert -- temperatures --.

Column 22,
Line 17, delete "substrate" and insert -- fin --.

Signed and Sealed this

First Day of February, 2005

JON W. DUDAS
*Director of the United States Patent and Trademark Office*